United States Patent
Gao et al.

(10) Patent No.: US 11,652,670 B2
(45) Date of Patent: May 16, 2023

(54) METHOD FOR TRANSMITTING SOUNDING REFERENCE SIGNAL AND TERMINAL DEVICE

(71) Applicant: HUAWEI TECHNOLOGIES CO., LTD., Guangdong (CN)

(72) Inventors: Xiang Gao, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 17/081,713

(22) Filed: Oct. 27, 2020

(65) Prior Publication Data
US 2021/0044458 A1 Feb. 11, 2021

Related U.S. Application Data

(63) Continuation of application No. PCT/CN2018/085209, filed on Apr. 28, 2018.

(51) Int. Cl.
H04L 25/02 (2006.01)
H04B 1/713 (2011.01)
(Continued)

(52) U.S. Cl.
CPC ......... *H04L 25/0226* (2013.01); *H04B 1/713* (2013.01); *H04L 1/1642* (2013.01); *H04L 5/005* (2013.01)

(58) Field of Classification Search
CPC ... H04L 25/0226; H04L 1/1642; H04L 5/005; H04L 5/0094; H04L 5/0051; H04L 1/00; H04B 1/713
See application file for complete search history.

(56) References Cited

U.S. PATENT DOCUMENTS 8,331,297 B2 12/2012 Teo et al.
10,251,174 B2 * 4/2019 Ogawa ............... H04J 13/004
(Continued)

FOREIGN PATENT DOCUMENTS

CN 101908916 A 12/2010
CN 102223167 A 10/2011
(Continued)

OTHER PUBLICATIONS

Samsung: 3GPP TSG RAN WG1 Meeting AH 1801, Vancouver, Canada, Vancouver, Canada, Jan. 22-26, 2018: R1-1800439.*
(Continued)

*Primary Examiner* — Harry H Kim
*Assistant Examiner* — Mohammed M Murshid
(74) *Attorney, Agent, or Firm* — Fish & Richardson P.C.

(57) ABSTRACT

A method for transmitting a sounding reference signal and a terminal device are provided. The method includes: receiving, by the terminal device, SRS configuration information from a network device; determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS; selecting the antenna port with the index of $\alpha(n_{SRS})$ from indexes corresponding to the $\Lambda$ antenna ports; and transmitting the SRS through the antenna port with the index of $\alpha(n_{SRS})$ during an $n_{SRS}{}^{th}$ SRS transmission. $n_{SRS}$ is an integer greater than or equal to 0, $\Lambda$ is a positive integer greater than or equal to 4, and a symbol * indicates a multiplication operation.

6 Claims, 15 Drawing Sheets

(51) Int. Cl.
   *H04L 1/16*   (2023.01)
   *H04L 5/00*   (2006.01)
   *H04L 1/1607* (2023.01)

(56) References Cited

U.S. PATENT DOCUMENTS

| | | | |
|---|---|---|---|
| 2015/0016489 A1* | 1/2015 | Mehta | H04L 5/0048 375/135 |
| 2017/0288832 A1 | 10/2017 | Islam et al. | |
| 2019/0158244 A1* | 5/2019 | Shin | H04L 5/0048 |
| 2019/0253214 A1* | 8/2019 | Liu | H04L 5/0051 |
| 2019/0319692 A1* | 10/2019 | Noh | H04L 5/0048 |
| 2021/0021391 A1* | 1/2021 | Wang | H04W 72/1268 |

FOREIGN PATENT DOCUMENTS

| | | |
|---|---|---|
| CN | 102595514 A | 7/2012 |
| CN | 104170506 A | 11/2014 |
| CN | 106549695 A | 3/2017 |
| CN | 106612556 A | 5/2017 |
| KR | 20190056929 A * | 11/2017 |

OTHER PUBLICATIONS

Qualcomm Incorporated: 3GPP TSG RAN WG1 Meeting #92, Athens, Greece, Feb. 26-Mar. 2, 2018: R1-1802983.*

Samsung, "Issues on SRS", 3GPP TSG RAN WG1 Meeting AH 1801, R1-1800439, 2Vancouver, Canada, Jan. 22-26, 2018, 4 pages.

Huawei, HiSilicon, "On SRS antenna switching for 4 transmission ports," 3GPP TSG RAN WG1 Meeting #92, R1-1801871, Feb. 26-Mar. 2, 2018, Athens, Greece, 5 pages.

Huawei, HiSilicon, "SRS antenna switching," 3GPP TSG RAN WG1 NR Ad Hoc Meeting, R1-1709938, Qingdao, China, Jun. 27-30, 2017, 4 pages.

Extended European Search Report in European Application No. 18916955.0, dated Mar. 10, 2021, 11 pages.

PCT International Search Report and Written Opinion issued in International Application No. PCT/CN2018/085209 dated Jan. 16, 2019, 11 pages (with English translation).

* cited by examiner

FIG. 3

| $n_{SRS}$ | Sub-band 0 | Sub-band 1 | Sub-band 2 | Sub-band 3 | Sub-band 4 | Sub-band 5 | Sub-band 6 | Sub-band 7 |
|---|---|---|---|---|---|---|---|---|
| 0 | Antenna port 0 | | | | | | | |
| 1 | | | | | Antenna port 1 | | | |
| 2 | | | Antenna port 2 | | | | | |
| 3 | | | | | | | Antenna port 3 | |
| 4 | | Antenna port 1 | | | | | | |
| 5 | | | | | | Antenna port 2 | | |
| 6 | | | | Antenna port 3 | | | | |
| 7 | | | | | | | | Antenna port 0 |
| 8 | Antenna port 1 | | | | | | | |
| 9 | | | | | Antenna port 2 | | | |
| 10 | | | Antenna port 3 | | | | | |
| 11 | | | | | | | Antenna port 0 | |
| 12 | | Antenna port 2 | | | | | | |
| 13 | | | | | | Antenna port 3 | | |
| 14 | | | | Antenna port 0 | | | | |
| 15 | | | | | | | | Antenna port 1 |
| 16 | Antenna port 2 | | | | | | | |
| 17 | | | | | Antenna port 3 | | | |

| 18 | | | Antenna port 0 | | | | | |
|---|---|---|---|---|---|---|---|---|
| 19 | | | | | | | Antenna port 1 | |
| 20 | | Antenna port 3 | | | | | | |
| 21 | | | | | Antenna port 0 | | | |
| 22 | | | | Antenna port 1 | | | | |
| 23 | | | | | | | | Antenna port 2 |
| 24 | Antenna port 3 | | | | | | | |
| 25 | | | | | Antenna port 0 | | | |
| 26 | | | Antenna port 1 | | | | | |
| 27 | | | | | | | Antenna port 2 | |
| 28 | | Antenna port 0 | | | | | | |
| 29 | | | | | Antenna port 1 | | | |
| 30 | | | | Antenna port 2 | | | | |
| 31 | | | | | | | | Antenna port 3 |

| $n_{SRS}$ | Sub-band 0 | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 | Sub-band 13 | Sub-band 14 | Sub-band 15 |
|---|---|---|---|---|---|---|---|---|---|---|---|---|---|---|---|---|
| 0 | Antenna port 0 | | | | | | | | | | | | | | | |
| 1 | | | | | | | | | Antenna port 1 | | | | | | | |
| 2 | | | | Antenna port 2 | | | | | | | | | | | | |
| 3 | | | | | | | | | | | | | Antenna port 3 | | | |
| 4 | | | Antenna port 1 | | | | | | | | | | | | | |
| 5 | | | | | | | | | | | Antenna port 2 | | | | | |
| 6 | | | | | | Antenna port 3 | | | | | | | | | | |
| 7 | | | | | | | | | | | | | | | Antenna port 0 | |
| 8 | | Antenna port 2 | | | | | | | | | | | | | | |

| | | | | | | | | | | | |
|---|---|---|---|---|---|---|---|---|---|---|---|
| 48 | Antenna port 3 | | | | | | | | | | |
| 49 | | | | | | | | | | | |
| 50 | | | | | | | | | | | |
| 51 | | | Antenna port 1 | | | | | | | | |
| 52 | | | | | | | | | | | |
| 53 | | | | Antenna port 0 | | | | | | | |
| 54 | | | | | | | Antenna port 2 | | | | |
| 55 | | | | | | | | | | | |
| 56 | | | | | | | | | Antenna port 1 | | |
| 57 | | | | | | | | | | | |
| 58 | | | | | | | | | | | |
| 59 | | | | | Antenna port 0 | | | | | | |
| 60 | | | | | | | | | | Antenna port 2 | |
| 61 | | | | | | | Antenna port 1 | | | | |
| 62 | | | | | | | | | | | |
| 63 | | | | | | Antenna port 2 | | | | | |
| 64 | | | | | | | | | | | Antenna port 3 |
| 65 | | | | | | | | | | | |

FIG. 4 Cont.

| | 58 | 59 | 60 | 61 | 62 | 63 |
|---|---|---|---|---|---|---|
| | | | | | | Antenna port 1 |
| | | | | | | |
| | | Antenna port 0 | | | | |
| | | | | | | |
| | | | | Antenna port 3 | | |
| | | | | | | |
| | | | | | | |
| | | | | | Antenna port 0 | |
| | | | | | | |
| | Antenna port 3 | | | | | |
| | | | | | | |
| | | | Antenna port 2 | | | |
| | | | | | | |
| | | | | | | |

FIG. 5

| $n_{SRS}$ | Sub-band 0 | Sub-band 1 | Sub-band 2 | Sub-band 3 | Sub-band 4 | Sub-band 5 | Sub-band 6 | Sub-band 7 |
|---|---|---|---|---|---|---|---|---|
| 0 | Antenna port 0 | | | | | | | |
| 1 | | | | | Antenna port 1 | | | |
| 2 | | | Antenna port 2 | | | | | |
| 3 | | | | | | | Antenna port 3 | |
| 4 | | Antenna port 1 | | | | | | |
| 5 | | | | | | Antenna port 2 | | |
| 6 | | | | Antenna port 3 | | | | |
| 7 | | | | | | | | Antenna port 0 |
| 8 | Antenna port 3 | | | | | | | |
| 9 | | | | | Antenna port 0 | | | |
| 10 | | | Antenna port 1 | | | | | |
| 11 | | | | | | | Antenna port 2 | |

FIG. 5 Cont.

| | | | | | | | |
|---|---|---|---|---|---|---|---|
| 12 | | Antenna port 0 | | | | | |
| 13 | | | | | Antenna port 1 | | |
| 14 | | | Antenna port 2 | | | | |
| 15 | | | | | | | Antenna port 3 |
| 16 | Antenna port 2 | | | | | | |
| 17 | | | | Antenna port 3 | | | |
| 18 | | Antenna port 0 | | | | | |
| 19 | | | | | | Antenna port 1 | |
| 20 | | Antenna port 3 | | | | | |
| 21 | | | | | Antenna port 0 | | |
| 22 | | | Antenna port 1 | | | | |
| 23 | | | | | | | Antenna port 2 |
| 24 | Antenna port 1 | | | | | | |

FIG. 5 Cont.

| 25 | | | | | Antenna port 2 | | | |
|---|---|---|---|---|---|---|---|---|
| 26 | | | Antenna port 3 | | | | | |
| 27 | | | | | | | Antenna port 0 | |
| 28 | | Antenna port 2 | | | | | | |
| 29 | | | | | | Antenna port 3 | | |
| 30 | | | | Antenna port 0 | | | | |
| 31 | | | | | | | | Antenna port 1 |

METHOD FOR TRANSMITTING SOUNDING REFERENCE SIGNAL AND TERMINAL DEVICE

CROSS-REFERENCE TO RELATED APPLICATIONS

This application is a continuation of International Application No. PCT/CN2018/085209, filed on Apr. 28, 2018, the disclosure of which is hereby incorporated by reference in its entirety.

TECHNICAL FIELD

This application relates to the communications field, and more specifically, to a method for transmitting a sounding reference signal and a terminal device.

BACKGROUND

In a long term evolution (long term evolution, LTE) system, a sounding reference signal (sounding reference signal, SRS) is a signal for measuring channel state information (channel state information, CSI) between a terminal device and a network device. To assist the network device in performing uplink channel measurement, the network device may configure a terminal device in a cell served by the network device to send an SRS on an antenna, to obtain uplink channel state information corresponding to each antenna. Then, the network device estimates, based on the received SRS, an uplink channel state corresponding to each antenna, if there is uplink and downlink channel reciprocity between the terminal device and the network device, the network device may further estimate, based on the received SRS, a downlink channel state corresponding to each antenna.

When a plurality of receive antenna ports are configured for the terminal device, to obtain complete channel information corresponding to all antennas, the terminal device needs to send an SRS to the network device through as many antenna ports as possible. In this way, antenna selection is involved when the terminal device transmits the SRS. To be specific, when transmitting the SRS, the terminal device needs to switch between a plurality of antennas. Currently, an LTE protocol supports 1T2R (1T2R) antenna selection. To be specific, the terminal device selects one antenna port from two antenna ports at a same moment according to an antenna selection formula, to transmit the SRS.

With continuous development of communications technologies, for a terminal device that supports 1T4R (1T4R) antenna selection, one antenna port needs to be selected from four antenna ports at a same moment to transmit the SRS. The 1T2R antenna selection formula supported by the existing LTE protocol cannot be applied to SRS antenna selection of four antenna ports.

SUMMARY

This application provides a method for transmitting a sounding reference signal and a terminal device, to support SRS antenna selection of four antenna ports.

According to a first aspect, a method for transmitting a sounding reference signal is provided. The method includes: receiving, by a terminal device, SRS configuration information from a network device; determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS; selecting, by the terminal device, the antenna port with the index of $\alpha(n_{SRS})$ from indexes corresponding to the $\Lambda$ antenna ports; and transmitting the SRS through the antenna port with the index of $\alpha(n_{SRS})$ during an $n_{SRS}^{th}$ SRS transmission.

$n_{SRS}$ is an integer greater than or equal to 0, $\Lambda$ is a positive integer greater than or equal to 4, and a symbol * indicates a multiplication operation.

According to the foregoing method, in consideration of a requirement of an actual application scenario, the terminal device may determine, based on the one or more of the SRS bandwidth configuration parameter, the sequence number $n_{SRS}$ of the quantity of SRS transmissions, the quantity $\Lambda$ of antenna ports, and the SRS configuration information, the index $\alpha(n_{SRS})$ corresponding to the antenna port used to transmit the SRS, and select the antenna port with the index of $\alpha(n_{SRS})$ from the indexes corresponding to the $\Lambda$ antenna ports, so that SRS antenna selection of four antenna ports can be supported.

In a possible design, the SRS configuration information includes but is not limited to one or both of $b_{hop}$ and $B_{SRS}$, and the SRS bandwidth configuration parameter includes but is not limited to one or more of $N_1$, $N_2$, and $N_3$. Each of $b_{hop}$ and $B_{SRS}$ is any value in $\{0, 1, 2, 3\}$; $N_1$, $N_2$, and $N_3$ are positive integers; $N_1$ indicates a quantity of second-level sub-bandwidths into which a first-level sub-bandwidth is divided; $N_2$ indicates a quantity of third-level sub-bandwidths into which a second-level sub-bandwidth is divided; $N_3$ indicates a quantity of fourth-level sub-bandwidths into which a third-level sub-bandwidth is divided; a value of $B_{SRS}$ being 0 is used to indicate that an SRS transmission sub-bandwidth is a first-level sub-bandwidth, a value of $B_{SRS}$ being 1 is used to indicate that an SRS transmission sub-bandwidth is a second-level sub-bandwidth, a value of $B_{SRS}$ being 2 is used to indicate that an SRS transmission sub-bandwidth is a third-level sub-bandwidth, or a value of $B_{SRS}$ being 3 is used to indicate that an SRS transmission sub-bandwidth is a fourth-level sub-bandwidth; a value of $b_{hop}$ being 0 is used to indicate that an SRS frequency hopping bandwidth is a first-level sub-bandwidth, a value of $b_{hop}$ being 1 is used to indicate that an SRS frequency hopping bandwidth is a second-level sub-bandwidth, a value of $b_{hop}$ being 2 is used to indicate that an SRS frequency hopping bandwidth is a third-level sub-bandwidth, or a value of $b_{hop}$ being 3 is used to indicate that an SRS frequency hopping bandwidth is a fourth-level sub-bandwidth; and the value of $b_{hop}$ is less than or equal to the value of $B_{SRS}$.

For detailed content included in the SRS configuration information and the SRS bandwidth configuration parameter, refer to the LTE TS 36.211 protocol.

In a possible design, $N_1=N_2=2$, or $b_{hop}=1$, $B_{SRS}=3$, $N_2=2$, and $N_3=4$; and the terminal device may determine, based on the sequence number $n_{SRS}$ of the quantity of SRS transmissions, the quantity $\Lambda$ of antenna ports, $N_1$, and $N_2$ or based on the sequence number $n_{SRS}$ of the quantity of transmissions, the quantity $\Lambda$ of antenna ports, $b_{hop}$, $B_{SRS}$, $N_2$, and $N_3$, the index $\alpha(n_{SRS})$ corresponding to the antenna port used to transmit the SRS, so that the index $\alpha(n_{SRS})$ corresponding to the antenna port used to transmit the SRS for an $n_{SRS}^{th}$ time is different from an index $\alpha(n_{SRS}+\Lambda)$ corresponding to an antenna port used to transmit the SRS for an $(n_{SRS}+\Lambda)^{th}$ time. In a process of transmitting the SRS for a limited quantity of times, for example, for K times, there can be a relatively large frequency spacing between two adjacent SRS sub-bandwidths occupied by the SRS sent through a same antenna port, so that SRS sub-bandwidths that are relatively discretely distributed are selected from a frequency hopping bandwidth for the same antenna port to send the SRS. To be specific, the terminal device can send the SRS through as many antenna ports as possible, so that channel sounding with a larger bandwidth range can be implemented within a relatively small quantity of SRS transmissions, thereby improving channel sounding efficiency and accuracy.

In a possible design, the determining, by the terminal device based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS includes:

when $\Pi_{b'=b_{hop}}^{B_{SRS}} N_{b'}(N_{b_{hop}}=1)$ is an odd number, determining, by the terminal device based on $n_{SRS}$ and $\Lambda$, the index $\alpha(n_{SRS})$ corresponding to the antenna port used to transmit the SRS; or when $\Pi_{b'=b_{hop}}^{B_{SRS}} N_{b'}(N_{b_{hop}}=1)$ is an even number, determining, by the terminal device based on $n_{SRS}$ and $$\left\lfloor \frac{n_{SRS}}{\max\left(\Lambda, \prod_{b'=b_{hop}}^{B_{SRS}} N_{b'}(N_{b_{hop}}=1)\right)} \right\rfloor$$

or based on $n_{SRS}$, $$\left\lfloor \frac{n_{SRS}}{\max\left(\Lambda, \prod_{b'=b_{hop}}^{B_{SRS}} N_{b'}(N_{b_{hop}}=1)\right)} \right\rfloor, \text{ and}$$

$$\left(\left\lfloor \frac{n_{SRS}}{\Lambda} \right\rfloor \bmod \left\lfloor \frac{\max\left(\Lambda, \prod_{b'=b_{hop}}^{B_{SRS}} N_{b'}(N_{b_{hop}}=1)\right)}{\Lambda} \right\rfloor\right),$$

the index $\alpha(n_{SRS})$ corresponding to the antenna port used to transmit the SRS, where $\max(\Lambda, \Pi_{b'=b_{hop}}^{B_{SRS}} N_{b'}(N_{b_{hop}}=1))$ is used to indicate a larger one of $\Lambda$ and $\Pi_{b'=b_{hop}}^{B_{SRS}} N_{b'}(N_{b_{hop}}=1)$, a symbol $\lfloor \ \rfloor$ indicates rounding down, a symbol mod indicates a modulo budget, and a symbol $\Pi$ indicates a continued multiplication operation.

In a possible design, a sequence number $\alpha(n_{SRS})$ of the antenna port used by the terminal device to transmit the SRS satisfies the following formulas:

$$a(n_{SRS}) = \begin{cases} \left(n_{SRS} + \left\lfloor \frac{n_{SRS}}{\max(\Lambda, K)} \right\rfloor + \right. \\ \left. \beta\left(\left\lfloor \frac{n_{SRS}}{\Lambda} \right\rfloor \bmod \left\lfloor \frac{\max(\Lambda, K)}{\Lambda} \right\rfloor\right)\right) \bmod \Lambda \\ \quad \text{when } K \text{ is an even number} \\ n_{SRS} \bmod \Lambda \quad \text{when } K \text{ is an odd number} \end{cases}$$

where $$K = \prod_{b'=b_{hop}}^{B_{SRS}} N_{b'}(N_{b_{hop}}=1), \text{ and}$$

$$\beta = \begin{cases} 1 & \text{when } \{N_{b_{hop}+1} = N_{b_{hop}+2} = 2\} \text{ or} \\ & \quad \{N_{b_{hop}+1} = 2, N_{B_{SRS}} = 4\} \\ 0 & \text{others} \end{cases}.$$

It should be noted that a meaning of the expression $K = \Pi_{b'=b_{hop}}^{B_{SRS}} N_{b'}(N_{b_{hop}}=1)$ in this application is as follows: When a continued product of $N_{b'}=b_{hop}$ to $N_{b'}=B_{SRS}$ is calculated, and $b'=b_{hop}$, $N_{b'}=N_{b_{hop}}=1$.

In a possible design, a sequence number $\alpha(n_{SRS})$ of the antenna port used by the terminal device to transmit the SRS satisfies the following formulas:

$$a(n_{SRS}) = \begin{cases} \left(n_{SRS} + \left\lfloor \frac{n_{SRS}}{\max(\Lambda, K)} \right\rfloor + \right. \\ \left. \beta\left(\left\lfloor \frac{n_{SRS}}{\Lambda} \right\rfloor \bmod \left\lfloor \frac{\max(\Lambda, K)}{\Lambda} \right\rfloor\right)\right) \bmod \Lambda \\ \quad \text{when } K \text{ is an even number} \\ n_{SRS} \bmod \Lambda \quad \text{when } K \text{ is an odd number} \end{cases}$$

where $$K = \prod_{b'=b_{hop}}^{B_{SRS}} N_{b'}(N_{b_{hop}}=1), \text{ and}$$

$$\beta = \begin{cases} 1 & \text{when } \{N_1 = N_2 = 2\} \text{ or } \{N_2 = 2, N_3 = 4, b_{hop} = 1, B_{SRS} = 3\} \\ 0 & \text{others} \end{cases}.$$

In a possible design, the determining, by the terminal device based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS includes:

when $\Pi_{b'=b_{hop}}^{B_{SRS}} N_{b'}(N_{b_{hop}}=1)$ is an odd number, determining, by the terminal device based on $n_{SRS}$ and $\Lambda$, the index $\alpha(n_{SRS})$ corresponding to the antenna port used to transmit the SRS; or when $\Pi_{b'=b_{hop}}^{B_{SRS}} N_{b'}(N_{b_{hop}}=1)$ is an even number, determining, by the terminal device based on at least one of $n_{SRS}$, $$\left\lfloor \frac{n_{SRS}}{\max\left(\Lambda, \prod_{b'=b_{hop}}^{B_{SRS}} N_{b'}(N_{b_{hop}}=1)\right)} \right\rfloor, \text{ and } \left\lfloor \frac{n_{SRS}}{\Lambda} \right\rfloor,$$

the index $\alpha(n_{SRS})$ corresponding to the antenna port used to transmit the SRS, where $\max(\Lambda, \Pi_{b'=b_{hop}}^{B_{SRS}} N_{b'}(N_{b_{hop}}=1))$ is used to indicate a larger one of $\Lambda$ and $\Pi_{b'=b_{hop}}^{B_{SRS}} N_{b'}(N_{b_{hop}}=1)$, and a symbol $\lfloor \ \rfloor$ indicates rounding down.

In a possible design, a sequence number $\alpha(n_{SRS})$ of the antenna port used by the terminal device to transmit the SRS satisfies the following formulas:

$$a(n_{SRS}) =$$

$$\begin{cases} (n_{SRS} + \alpha \cdot \lfloor n_{SRS}/\max(\Lambda, K) \rfloor + \\ \quad \beta \cdot \lfloor n_{SRS}/\Lambda \rfloor) \mod \Lambda, & \text{when } K \text{ is an even number} \\ n_{SRS} \mod \Lambda, & \text{when } K \text{ is an odd number} \end{cases},$$

where $$K = \prod_{b'=b_{hop}}^{B_{SRS}} N_{b'}(N_{b_{hop}} = 1),$$ a symbol mod indicates a modulo budget, $$\alpha = \begin{cases} 0 & \text{when } \begin{cases} \{B_{SRS} = b_{hop} + 3, N_{b_{hop}+1} = N_{b_{hop}+2} = 2, \\ N_{B_{SRS}} \text{ is an odd number} \} \text{ or} \\ \{N_{b_{hop}+1} = 2, N_{B_{SRS}} = 6\} \end{cases}, \text{ and} \\ 1 & \text{others} \end{cases}$$

$$\beta = \begin{cases} 1 & \text{when } \{B_{SRS} = b_{hop} + 3, N_{b_{hop}+1} = N_{b_{hop}+2} = 2\} \text{ or} \\ & \{N_{b_{hop}+1} = 2, N_{B_{SRS}} = 4\} \\ 0 & \text{others} \end{cases}.$$

In this embodiment of this application, according to the method in any one of the foregoing possible designs, each of the Λ antenna ports may transmit the SRS at least once in a process of 2*Λ SRS transmissions. In a process of K*Λ SRS transmissions, each of the Λ antenna ports transmits the SRS once in each SRS transmission sub-bandwidth included in the SRS frequency hopping bandwidth, so that each of the Λ antenna ports can be traversed in all the SRS transmission sub-bandwidths.

According to a second aspect, a terminal device is provided. The terminal device has a function of implementing behavior of the terminal device in the foregoing method example of the first aspect. The function may be implemented by hardware, or may be implemented by hardware by executing corresponding software. The hardware or software includes one or more modules corresponding to the foregoing function.

In a possible design, the terminal device includes a storage unit, a transceiver unit, and a processing unit. These units may perform corresponding functions in the method example of the first aspect. For details, refer to detailed descriptions in the method example. Details are not described herein again.

In another possible design, the terminal device includes a memory, a processor, and a transceiver. The memory is configured to store a program. The processor is configured to execute the program stored in the memory, and when the program is executed, the processor performs, by using the transceiver, the method according to any one of the first aspect or the possible implementations of the first aspect.

According to a third aspect, a chip is provided, including a memory, a processor, and a transceiver. The memory is configured to store a program. The processor is configured to execute the program stored in the memory, and when the program is executed, the processor performs, by using the transceiver, the method according to any one of the first aspect or the possible implementations of the first aspect.

According to a fourth aspect, a computer-readable storage medium is provided, including a computer instruction. When the computer instruction is run on the terminal device, the terminal device is enabled to perform the method according to any one of the first aspect or the possible implementations of the first aspect.

According to a fifth aspect, a computer program product is provided. When the computer program product runs on the terminal device, the terminal device is enabled to perform the method according to any one of the first aspect or the possible implementations of the first aspect.

BRIEF DESCRIPTION OF DRAWINGS

FIG. 3 is an effect diagram of selecting an antenna port used to transmit an SRS according to an embodiment of this application;

FIG. 4 is another effect diagram of selecting an antenna port used to transmit an SRS according to an embodiment of this application;

FIG. 5 is still another effect diagram of selecting an antenna port used to transmit an SRS according to an embodiment of this application;

DESCRIPTION OF EMBODIMENTS

Figure 1:
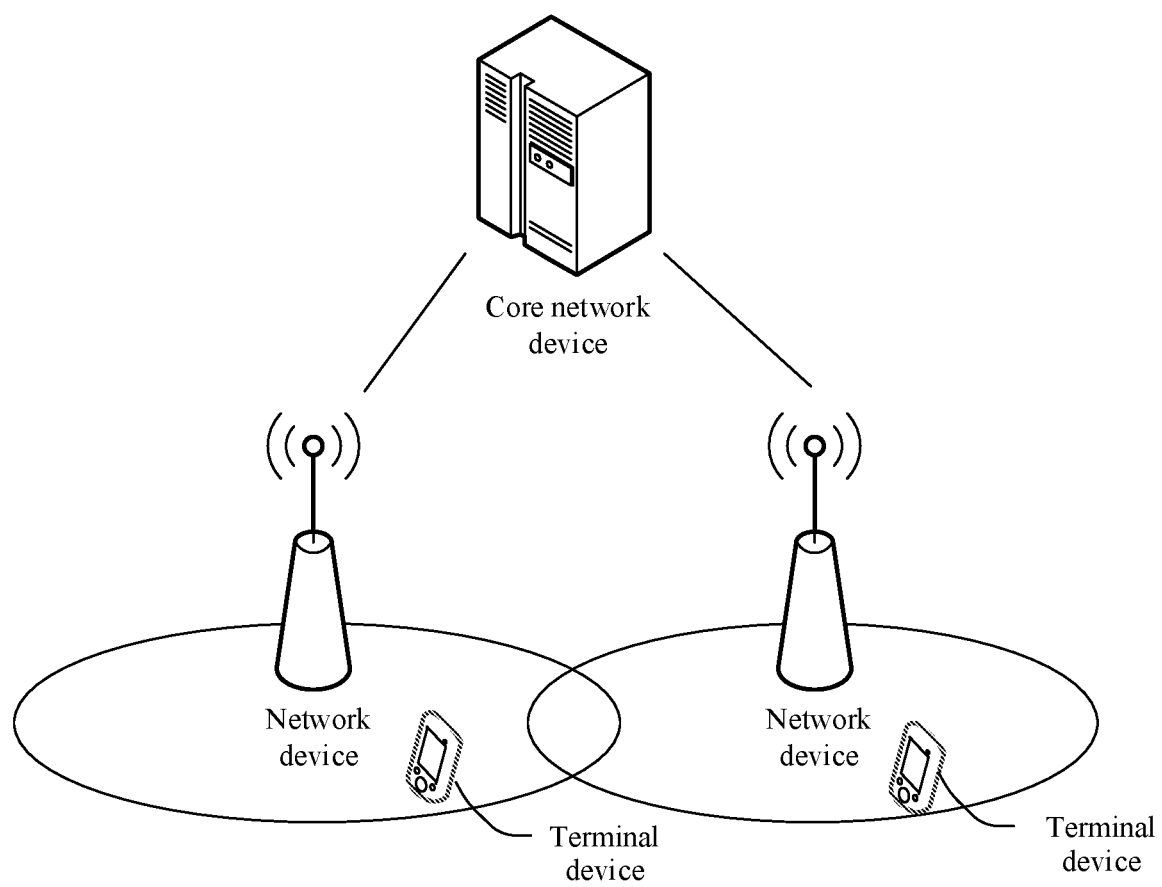
FIG. 1 is a schematic diagram of a network architecture to which embodiments of this application are applicable.

The following describes the technical solutions of this application with reference to the accompanying drawings.

The technical solutions in embodiments of this application may be applied to various communications systems, for example, a cellular-based narrowband internet of things (narrowband internet of things, NB-IoT) system, a global system for mobile communications (global system of mobile communication, GSM) system, a code division multiple access (code division multiple access, CDMA) system, a wideband code division multiple access (wideband code division multiple access, WCDMA) system, and a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), and worldwide interoperability for microwave access (worldwide interoperability for microwave access, WiMAX) communications system, a future 5th generation (5th generation, 5G) system, a new radio (new radio, NR) system, and the like.

A type of a terminal device is not specifically limited in the embodiments of this application, and the terminal device may be any device configured to communicate with a network device. The terminal device may be, for example, user equipment, an access terminal, a terminal device, a subscriber unit, a subscriber station, a mobile station, a mobile console, a remote station, a remote terminal, a mobile device, a user terminal, a wireless network device, a user agent, or a user apparatus. The terminal may include but is not limited to a relay node (relay node), a mobile station (mobile station, MS), a mobile telephone (mobile telephone), user equipment (user equipment, UE), a mobile phone (handset), portable equipment (portable equipment), a cellular phone, a cordless telephone set, a session initiation protocol (session initiation protocol, SIP) phone, a wireless local loop (wireless local loop, WLL) station, a personal digital assistant (personal digital assistant, PDA), a radio frequency identification (radio frequency identification, RFID) terminal device for logistics, a handheld device with a wireless communication function, a computing device, another device connected to a wireless modem, a vehicle-mounted device, a wearable device, an internet of things, a terminal device in a vehicle network, a terminal device in a future 5G network, a terminal device in a future evolved public land mobile network (public land mobile network, PLMN) network, and the like.

As an example rather than a limitation, in the embodiments of the present invention, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smartwatches or smart glasses, and devices that focus on only one type of application function and need to work with other devices such as smartphones, such as various smart bands or smart jewelry for monitoring physical signs.

A type of the network device mentioned in the embodiments of this application is not specifically limited. The network device may be any device configured to communicate with the terminal device. The network device may be, for example, a base transceiver station (base transceiver station, BTS) in a global system for mobile communications (global system of mobile communication, GSM) or a code division multiple access (code division multiple access, CDMA) system, or may be a NodeB (NodeB, NB) in a wideband code division multiple access (wideband code division multiple access, WCDMA) system, or may be an evolved NodeB (evolutional NodeB, eNB or eNodeB) in a long term evolution (long term evolution, LTE) system, or may be a radio controller in a scenario of a cloud radio access network (cloud radio access network, CRAN). Alternatively, the network device may be, for example, a relay node, an access point, a vehicle-mounted device, a wearable device, a network device in a future 5G network, a network device in a future evolved PLMN network, or the like.

FIG. 1 is a schematic diagram of a network architecture to which embodiments of this application are applicable. As shown in FIG. 1, a terminal device may access a wireless network via a network device, to obtain a service of an external network (for example, the Internet) through the wireless network, or communicate with another terminal device through the wireless network. The wireless network includes the network device and a core network device, and the core network device is configured to: manage the terminal device and provide a gateway for communicating with the external network.

In the network architecture shown in FIG. 1, to assist the network device in performing uplink channel measurement, the network device may configure a terminal device in a cell in which the network device is located to send an SRS on an antenna, to obtain uplink channel state information corresponding to each antenna, and then the network device estimates, based on the received SRS, an uplink channel state corresponding to each antenna. When a plurality of receive antenna ports are configured for the terminal device, for example, for a terminal device configured with 1T4R antennas, the terminal device may support one transmit antenna (one transmit link) and four receive antennas. To obtain complete channel information corresponding to all antennas, the terminal device needs to send an SRS to the network device through as many antenna ports as possible. In this way, antenna selection is involved when the terminal device transmits the SRS.

A current LTE protocol can support antenna selection of two antenna ports, but cannot be applied to antenna selection of four antenna ports (to be specific, a current LTE system cannot select any one antenna port from the four antenna ports to transmit the SRS).

Based on the foregoing existing problem, an embodiment of this application provides a method for transmitting a sounding reference signal, to implement antenna selection of four antenna ports. The following describes the embodiments of this application in detail with reference to FIG. 2.

Figure 2:
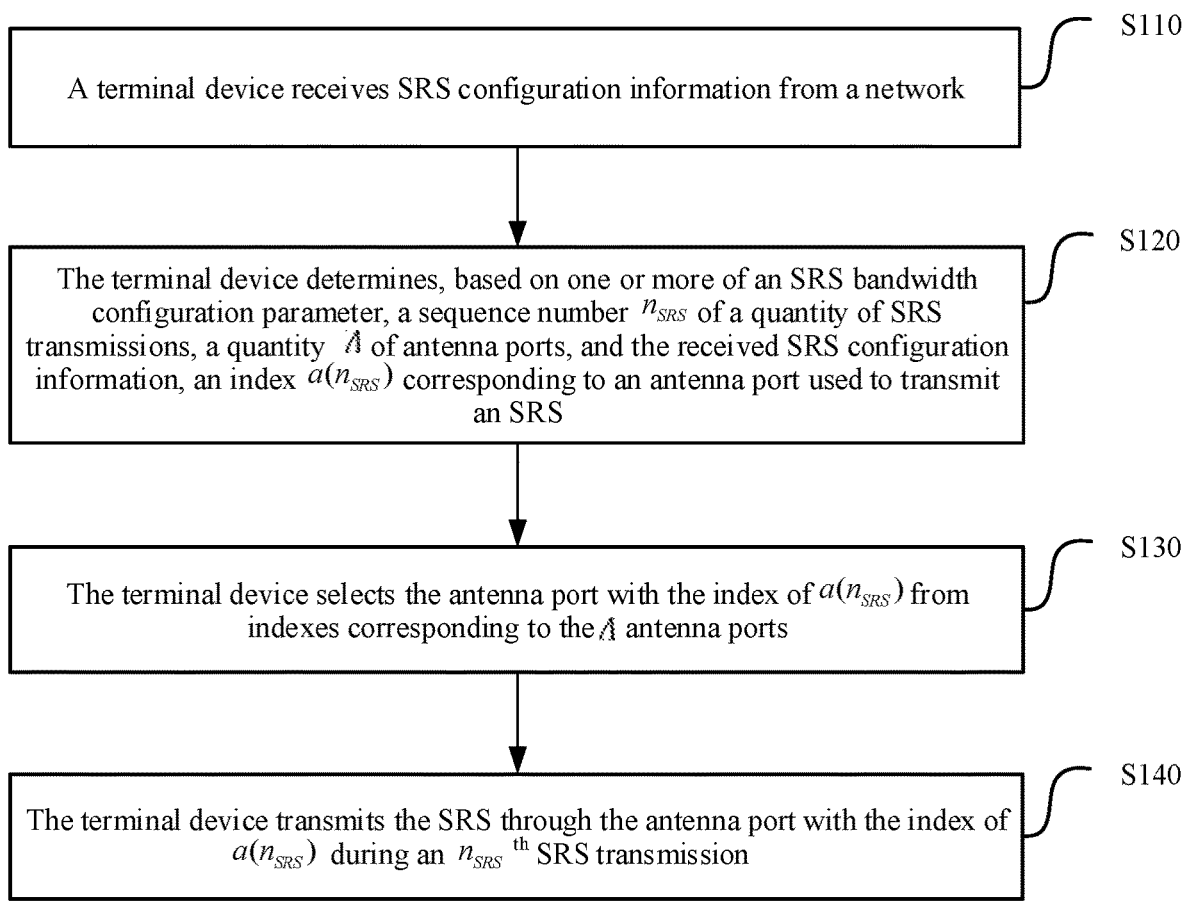
FIG. 2 is a flowchart of a method for transmitting a sounding reference signal according to an embodiment of this application.

FIG. 2 is a flowchart of a method for transmitting a sounding reference signal according to an embodiment of this application. The method in FIG. 2 may include steps 110 to 140. The following separately describes steps 110 to 140 in detail.

Step 110: A terminal device receives SRS configuration information from a network device.

Step 120: The terminal device determines, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit the SRS.

$n_{SRS}$ is an integer greater than or equal to 0, $\alpha(n_{SRS})$ may be a positive integer greater than or equal to 0, and a symbol * indicates a multiplication operation.

In this embodiment of this application, the quantity $\Lambda$ of antenna ports is not specifically limited. For example, the quantity of antenna ports may be a positive integer greater than or equal to 4.

Step 120 may be implemented in many manners. This is not specifically limited in this embodiment of this application.

For example, when $\Pi_{b'=b_{hop}}^{B_{SRS}} N_{b'}(N_{b_{hop}}=1)$ is an odd number, the terminal device may determine, based on $n_{SRS}$ and $\Lambda$, the index $\alpha(n_{SRS})$ corresponding to the antenna port used to transmit the SRS. When $\Pi_{b'=b_{hop}}^{B_{SRS}} N_{b'}(N_{b_{hop}}=1)$ is an even number, the terminal device determines, based on $n_{SRS}$ and $$\left\lfloor \frac{n_{SRS}}{\max\left(\Lambda, \prod_{b'=b_{hop}}^{B_{SRS}} N_{b'}(N_{b_{hop}}=1)\right)} \right\rfloor$$

or based on $n_{SRS}$, $$\left\lfloor \frac{n_{SRS}}{\max\left(\Lambda, \prod_{b'=b_{hop}}^{B_{SRS}} N_{b'}(N_{b_{hop}}=1)\right)} \right\rfloor,$$

$$\text{and} \left\lfloor \left\lfloor \frac{n_{SRS}}{\Lambda} \right\rfloor \mod \left\lfloor \frac{\max\left(\Lambda, \prod_{b'=b_{hop}}^{B_{SRS}} N_{b'}(N_{b_{hop}}=1)\right)}{\Lambda} \right\rfloor \right\rfloor,$$

the index $\alpha(n_{SRS})$ corresponding to the antenna port used to transmit the SRS. For another example, when $\Pi_{b'=b_{hop}}^{B_{SRS}} N_{b'} (N_{b_{hop}}=1)$ is an odd number, the terminal device may further determine, based on $n_{SRS}$ and $\Lambda$, the index $\alpha(n_{SRS})$ corresponding to the antenna port used to transmit the SRS. When $\Pi_{b'=b_{hop}}^{B_{SRS}} N_{b'}(N_{b_{hop}}=1)$ is an even number, the terminal device may further determine, based on at least one of $n_{SRS}$ $$\left\lfloor \frac{n_{SRS}}{\max\left(\Lambda, \prod_{b'=b_{hop}}^{B_{SRS}} N_{b'}(N_{b_{hop}}=1)\right)} \right\rfloor, \text{ and } \left\lfloor \frac{n_{SRS}}{\Lambda} \right\rfloor,$$

the index $\alpha(n_{SRS})$ corresponding to the antenna port used to transmit the SRS. The following describes the two implementations in detail with reference to FIG. 3 to FIG. 5, and details are not described herein.

$\max(\Lambda, \Pi_{b'=b_{hop}}^{B_{SRS}} N_{b'}(N_{b_{hop}}=1))$ is used to indicate a larger one of $\Lambda$ and $\Pi_{b'=b_{hop}}^{B_{SRS}} N_{b'}(N_{b_{hop}}=1)$, a symbol $\lfloor \ \rfloor$ indicates rounding down, a symbol mod indicates a modulo budget, and a symbol $\Pi$ indicates a continued multiplication operation.

It should be noted that in this embodiment of this application, rounding a parameter down indicates that a maximum integer that is not greater than the parameter is obtained. For example, $$\left\lfloor \frac{n_{SRS}}{\Lambda} \right\rfloor$$

indicates a maximum integer that is not greater than $$\frac{n_{SRS}}{\Lambda}.$$

A mod B indicates a remainder obtained by dividing A by B. For example, $$\left\lfloor \left\lfloor \frac{n_{SRS}}{\Lambda} \right\rfloor \mod \left\lfloor \frac{\max\left(\Lambda, \prod_{b'=b_{hop}}^{B_{SRS}} N_{b'}(N_{b_{hop}}=1)\right)}{\Lambda} \right\rfloor \right\rfloor$$

indicates a remainder obtained by dividing $$\left\lfloor \frac{n_{SRS}}{\Lambda} \right\rfloor$$

by $$\left\lfloor \frac{\max\left(\Lambda, \prod_{b'=b_{hop}}^{B_{SRS}} N_{b'}(N_{b_{hop}}=1)\right)}{\Lambda} \right\rfloor.$$

Step 130: The terminal device selects the antenna port with the index of $\alpha(n_{SRS})$ from indexes corresponding to the $\Lambda$ antenna ports.

Step 140: The terminal device transmits the SRS through the antenna port with the index of $\alpha(n_{SRS})$ during an $n_{SRS}^{th}$ SRS transmission.

In this embodiment of this application, the terminal device can support antenna selection. When the terminal device enables the antenna selection, the terminal device may select the antenna port with a sequence number of $\alpha(n_{SRS})$ from the $\Lambda$ antenna ports based on the one or more of the SRS bandwidth configuration parameter, the sequence number $n_{SRS}$ of the quantity of SRS transmissions, the quantity $\Lambda$ of antenna ports, and the received SRS configuration information, and transmit the SRS on the antenna port with the sequence number of $\alpha(n_{SRS})$, so that SRS antenna selection of four antenna ports can be supported.

An application scenario of the antenna selection is not limited in this embodiment of this application. In a possible application scenario, the terminal device performs antenna selection in a frequency hopping process. In this scenario, a selection sequence of SRS transmission sub-bandwidths included in an SRS frequency hopping bandwidth, a total SRS frequency hopping bandwidth, and a quantity of the SRS transmission sub-bandwidths included in the SRS frequency hopping bandwidth in the frequency hopping process are not specifically limited, for example, may be determined based on the SRS configuration information and the SRS bandwidth configuration parameter.

In a possible design, the SRS configuration information includes but is not limited to one or both of $b_{hop}$ and $B_{SRS}$, and the SRS bandwidth configuration parameter includes but is not limited to one or more of $N_1$, $N_2$, and $N_3$.

Each of $b_{hop}$ and $B_{SRS}$ is any value in $\{0, 1, 2, 3\}$; $N_1$, $N_2$, and $N_3$ are positive integers; $N_1$ indicates a quantity of second-level sub-bandwidths into which a first-level sub-bandwidth is divided; $N_2$ indicates a quantity of third-level sub-bandwidths into which a second-level sub-bandwidth is divided; $N_3$ indicates a quantity of fourth-level sub-bandwidths into which a third-level sub-bandwidth is divided; a value of $B_{SRS}$ being 0 is used to indicate that an SRS transmission sub-bandwidth is a first-level sub-bandwidth, a value of $B_{SRS}$ being 1 is used to indicate that an SRS transmission sub-bandwidth is a second-level sub-bandwidth, a value of $B_{SRS}$ being 2 is used to indicate that an SRS transmission sub-bandwidth is a third-level sub-bandwidth, or a value of $B_{SRS}$ being 3 is used to indicate that an SRS transmission sub-bandwidth is a fourth-level sub-bandwidth; a value of $b_{hop}$ being 0 is used to indicate that an SRS frequency hopping bandwidth is a first-level sub-bandwidth, a value of $b_{hop}$ being 1 is used to indicate that an SRS frequency hopping bandwidth is a second-level sub-bandwidth, a value of $b_{hop}$ being 2 is used to indicate that an SRS frequency hopping bandwidth is a third-level sub-bandwidth, or a value of $b_{hop}$ being 3 is used to indicate that an SRS frequency hopping bandwidth is a fourth-level sub-bandwidth; and the value of $b_{hop}$ is less than or equal to the value of $B_{SRS}$.

It may be understood that when the terminal device enables frequency hopping, the value of $b_{hop}$ is less than or equal to the value of $B_{SRS}$. In this embodiment of this application, an example of a scenario in which the terminal device enables the frequency hopping is used below for description.

In the section 5.5.3.2 of the 3GPP LTE specification TS36.211, different SRS bandwidth configuration parameters (Table 5.5.3.2-1 to Table 5.5.3.2-4) are respectively defined for different channel bandwidths. For example, an example in which an uplink bandwidth is 80 to 110 resource blocks (resource block, RB). Refer to Table 1.

TABLE 1

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 1, $C_{SRS}$ is a cell-level configured SRS bandwidth set. The terminal device may determine a group of (four) SRS-bandwidths by configuring $C_{SRS}$. $B_{SRS}$ is a user-level configured SRS sub-bandwidth. The terminal device may determine a sub-bandwidth $m_{SRS,B_{SRS}}$ of each hop of SRS frequency hopping based on $B_{SRS}$.

It should be noted that in this embodiment of this application, the first-level sub-bandwidth may be an SRS-bandwidth in the first column starting from the left of Table 1. By analogy, the second-level sub-bandwidth may be an SRS-bandwidth in the second column starting from the left of the table, the third-level sub-bandwidth may be an SRS-bandwidth in the third column starting from the left of the table, and the fourth-level sub-bandwidth may be an SRS-bandwidth in the fourth column starting from the left of the table. For example, when $C_{SRS}=0$, the first-level sub-bandwidth is 96 RBs, the second-level sub-bandwidth is 48 RBs, the third-level sub-bandwidth is 24 RBs, and the fourth-level sub-bandwidth is 4 RBs. In this case, the first-level sub-bandwidth may be divided into two second-level sub-bandwidths. In other words, in this case, corresponding $N_1=2$. The second-level sub-bandwidth may be divided into two third-level sub-bandwidths. In this case, corresponding $N_2=2$. The third-level sub-bandwidth may be divided into six fourth-level sub-bandwidths. In this case, corresponding $N_3=6$. The terminal device may determine, based on the value of $b_{hop}$, whether the first-level sub-bandwidth, the second-level sub-bandwidth, the third-level sub-bandwidth, or the fourth-level sub-bandwidth is used for the SRS frequency hopping bandwidth. Specifically, when the value of $b_{hop}$ is 0, the first-level sub-bandwidth is used for the SRS frequency hopping bandwidth. When the value of $b_{hop}$ is 1, the second-level sub-bandwidth is used for the SRS frequency hopping bandwidth. When the value of $b_{hop}$ is 2, the third-level sub-bandwidth is used for the SRS frequency hopping bandwidth. When the value of $b_{hop}$ is 3, the fourth-level sub-bandwidth is used for the SRS frequency hopping bandwidth. For example, when $C_{SRS}=2$, if the value of $b_{hop}$ is 1, the second-level sub-bandwidth is used for the SRS frequency hopping bandwidth. To be specific, a bandwidth of 40 RBs is correspondingly used. The terminal device may determine, based on the value of $B_{SRS}$, whether the first-level sub-bandwidth, the second-level sub-bandwidth, the third-level sub-bandwidth, or the fourth-level sub-bandwidth is used for the SRS transmission sub-bandwidth. Specifically, when the value of $B_{SRS}$ is 0, the first-level sub-bandwidth is used for the SRS transmission sub-bandwidth. When the value of $B_{SRS}$ is 1, the second-level sub-bandwidth is used for the SRS transmission sub-bandwidth. When the value of $B_{SRS}$ is 2, the third-level sub-bandwidth is used for the SRS transmission sub-bandwidth. When the value of $B_{SRS}$ is 3, the fourth-level sub-bandwidth is used for the SRS frequency hopping bandwidth. For example, when $C_{SRS}=2$, if the value of $B_{SRS}$ is 3, the fourth-level sub-bandwidth is used for the SRS transmission sub-bandwidth. To be specific, a bandwidth of 4 RBs is correspondingly used.

For detailed content included in the SRS configuration information and the SRS bandwidth configuration parameter, refer to the LTE TS 36.211 protocol.

Optionally, in some embodiments, the terminal device may select one antenna port from the $\Lambda$ antenna ports according to the following antenna selection formula, to transmit the SRS:

$$a(n_{SRS}) = \begin{cases} \left(n_{SRS} + \left\lfloor \frac{n_{SRS}}{\max(\Lambda, K)} \right\rfloor + \beta \left( \left\lfloor \frac{n_{SRS}}{\Lambda} \right\rfloor \mod \left\lfloor \frac{\max(\Lambda, K)}{\Lambda} \right\rfloor \right) \right) \mod \Lambda & \text{when } K \text{ is an even number} \\ n_{SRS} \mod \Lambda & \text{when } K \text{ is an odd number} \end{cases} \quad \text{Formula 1}$$

where $$K = \prod_{b'=b_{hop}}^{B_{SRS}} N_{b'}(N_{b_{hop}} = 1), \text{ and}$$

$$\beta = \begin{cases} 1 & \text{when } \{N_{b_{hop}+1} = N_{b_{hop}+2} = 2\} \text{ or } \{N_{b_{hop}+1} = 2, N_{B_{SRS}} = 4\} \\ 0 & \text{others} \end{cases}$$

It should be noted that a meaning of the expression $K = \prod_{b'=b_{hop}}^{B_{SRS}} N_{b'}(N_{b_{hop}}=1)$ in this application is as follows: When a continued product of $N_{b'} = b_{hop}$ to $N_{b'} = B_{SRS}$ is calculated, and $b' = b_{hop}$, $N_{b'} = N_{b_{hop}} = 1$.

Optionally, in some embodiments, the terminal device may select one antenna port from the $\Lambda$ antenna ports according to the following antenna selection formula, to transmit the SRS:

$$a(n_{SRS}) = \begin{cases} \left(n_{SRS} + \left\lfloor \frac{n_{SRS}}{\max(\Lambda, K)} \right\rfloor + \beta \left( \left\lfloor \frac{n_{SRS}}{\Lambda} \right\rfloor \mod \left\lfloor \frac{\max(\Lambda, K)}{\Lambda} \right\rfloor \right) \right) \mod \Lambda & \text{when } K \text{ is an even number} \\ n_{SRS} \mod \Lambda & \text{when } K \text{ is an odd number} \end{cases} \quad \text{Formula 2}$$

where $$K = \prod_{b'=b_{hop}}^{B_{SRS}} N_{b'}(N_{b_{hop}} = 1), \text{ and}$$

-continued
$$\beta = \begin{cases} 1 & \text{when } \{N_1 = N_2 = 2\} \text{ or} \\ & \{N_2 = 2, N_3 = 4, b_{hop} = 1, B_{SRS} = 3\} \\ 0 & \text{others} \end{cases}.$$

Optionally, in some embodiments, the terminal device may select one antenna port from the Λ antenna ports according to the following antenna selection formula, to transmit the SRS:

$$a(n_{SRS}) = \qquad\qquad\qquad\qquad\qquad\text{Formula 3}$$

$$\begin{cases} (n_{SRS} + \alpha \cdot \lfloor n_{SRS}/\max(\Lambda, K) \rfloor + \mod \Lambda, & \text{when } K \text{ is} \\ \quad \beta \cdot \lfloor n_{SRS}/\Lambda \rfloor) & \text{an even number} \\ n_{SRS} \mod \Lambda, & \text{when } K \text{ is an} \\ & \text{odd number} \end{cases}$$

where $$K = \prod_{b'=b_{hop}}^{B_{SRS}} N_{b'}(N_{b_{hop}} = 1), \begin{array}{l} \text{a symbol mod indicates} \\ \text{a modulo budget,} \end{array}$$

$$\alpha =$$

$$\begin{cases} 0 & \text{when } \begin{cases} \{B_{SRS} = b_{hop} + 3, N_{b_{hop}+1} = N_{b_{hop}+2} = 2, \\ \quad N_{B_{SRS}} \text{ is an odd number}\} \\ \{N_{b_{hop}+1} = 2, N_{B_{SRS}} = 6\} \end{cases} \text{ or} \\ 1 & \text{others} \end{cases}$$

, and $$\beta =$$

$$\begin{cases} 1 & \text{when } \begin{cases} \{B_{SRS} = b_{hop} + 3, N_{b_{hop}+1} = N_{b_{hop}+2} = 2\} \text{ or} \\ \{N_{b_{hop}+1} = 2, N_{B_{SRS}} = 4\} \end{cases} \\ 0 & \text{others} \end{cases}.$$

It should be understood that the terminal device may select one antenna port with the sequence number of $\alpha(n_{SRS})$ from four antenna ports at a moment according to any one of the formula 1 to the formula 3, to transmit the SRS.

In this embodiment of this application, K in the foregoing description is used to indicate a quantity of SRS transmission sub-bandwidths included in an SRS frequency hopping bandwidth, and K may be a positive integer greater than 0.

In a scenario in which the terminal device enables the frequency hopping, a frequency hopping manner may be used for the antenna port used to transmit the SRS, and the sequence number $n_{SRS}$ of the quantity of SRS transmissions may be used to indicate a quantity of times of transmitting the SRS.

According to the method provided in this embodiment of this application, in each process of K SRS transmissions, the Λ antenna ports may send SRSs with an equal probability, and a difference between quantities of times of sending the SRSs by the Λ antenna ports may not exceed 1. The terminal device may select, from the Λ antenna ports, one antenna port used to transmit the SRS, so that each of the Λ antenna ports transmits the SRS at least once in a process of 2Λ SRS transmissions. For example, when Λ is 4, the terminal device may select an antenna port 0 from the four antenna ports to transmit the SRS, or may select an antenna port 1 from the four antenna ports to transmit the SRS, or may select an antenna port 2 from the four antenna ports to transmit the SRS. Certainly, the terminal device may alternatively select an antenna port 3 from the four antenna ports to transmit the SRS.

It may be understood that, according to the method provided in this embodiment of this application, the terminal device may select, from the Λ antenna ports, one antenna port used to transmit the SRS, so that in a process of completing measurement of the SRS frequency hopping bandwidth (namely, in a process of Λ*K SRS transmissions), each of the Λ antenna ports can complete one SRS transmission in any SRS transmission sub-bandwidth included in the SRS frequency hopping bandwidth. For example, the terminal device may select, based on one or more of the sequence number $n_{SRS}$ of the quantity of SRS transmissions, the quantity Λ of antenna ports, and SRS frequency domain configuration parameters: $b_{hop}$, $B_{SRS}$, $N_1$, $N_2$, and $N_3$, the antenna port used to transmit the SRS, so that in the process of the Λ*K transmissions, a sequence number $\alpha(n_{SRS}+iK)$ of an antenna port used to transmit the SRS for an $(n_{SRS}+iK)^{th}$ time can be different from a sequence number $\alpha(n_{SRS}+(i-1)K)$ of an antenna port used to transmit the SRS for an $(n_{SRS}+(i-1)K)^{th}$ time and/or a sequence number $\alpha(n_{SRS}+iK)$ of an antenna port used to transmit the SRS for an $(n_{SRS}+iK)^{th}$ time can be different from a sequence number $\alpha(n_{SRS}+(i+1)K)$ of an antenna port used to transmit the SRS for an $(n_{SRS}+(i+1)K)^{th}$ time. i may be an integer that is greater than 0 and less than or equal to (Λ−2).

Further, according to the method provided in this embodiment of this application, in the process of the Λ*K SRS transmissions, a sequence including sequence numbers of antenna ports selected by the terminal device for the first K SRS transmissions may be a result of cyclic shifts of sequence numbers of antenna ports selected in a process of next K SRS transmissions. For example, for $n_{SRS}=0$ to $n_{SRS}=K-1$, sequence numbers of antenna ports selected for SRS transmission are antenna ports 0, 1, 2, 3, 0, 1, 2, 3, . . . . For $n_{SRS}=K$ to $n_{SRS}=2K-1$, sequence numbers of antenna ports selected in an SRS transmission process are antenna ports 1, 2, 3, 0, 1, 2, 3, 0, . . . . For $n_{SRS}=2K$ to $n_{SRS}=3K-1$, sequence numbers of antenna ports selected in an SRS transmission process are antenna ports 2, 3, 0, 1, 2, 3, 0, 1, . . . .

In this embodiment of this application, in the process of the Λ*K SRS transmissions, each of the Λ antenna ports can complete one SRS transmission in the K SRS transmission sub-bandwidths included in the SRS frequency hopping bandwidth. Therefore, each of the Λ antenna ports can be traversed in the K sub-bandwidths, to obtain complete channel information of the K sub-bandwidths corresponding to all the antenna ports may be obtained.

The following describes in more detail a specific implementation of selecting, from the Λ antenna ports according to the antenna selection formula, a sequence number of one antenna port used to transmit the SRS in the embodiments of this application with reference to specific examples. It should be noted that the examples below are merely intended to help persons skilled in the art understand the embodiments of this application, instead of limiting the embodiments of this application to a specific value or a specific scenario shown in the examples. Persons skilled in the art can clearly make various equivalent modifications or changes according to the examples described below, and such modifications and changes also fall within the scope of the embodiments of this application.

FIG. 3 is an effect diagram of selecting, according to the formula 1 provided in the embodiments of this application, an antenna port used to transmit the SRS. In FIG. 3, an example in which the quantity Λ of antenna ports is 4, the SRS configuration information includes $b_{hop}$ and $B_{SRS}$, and the SRS bandwidth configuration parameter includes $N_1$, $N_2$, sand $N_3$ is used to describe in detail a method for selecting, according to the formula 1, the antenna port used to transmit the SRS. Specifically, an example in which an uplink bandwidth is 80 to 110 RBs is used. For an SRS bandwidth configuration, refer to Table 1. Assuming that a cell-level configured SRS bandwidth $C_{SRS}=1$, the terminal device may determine four SRS sub-bandwidths based on the SRS bandwidth configuration of $C_{SRS}=1$, and the four SRS sub-bandwidths correspond to four SRS-bandwidths corresponding to a row of $C_{SRS}=1$ in Table 1. It can be learned from Table 1 that in this case, correspondingly, $N_2=2$ and $N_3=4$. Assuming that the value of $b_{hop}$ is 1 and the value of $B_{SRS}$ is 3, the terminal device may calculate K in the foregoing formula 1 by using these known parameters.

$K=N_{b_{hop}}*N_2*N_3=1*2*4=8$ may be obtained by using the expression $K=\Sigma_{b'=b_{hop}}^{B_{SRS}} N_b (N_{b_{hop}}=1)$ of K.

In this case, K=8 is an even number, and $N_{b_{hop}}+1=N_2=2$ and $N_{B_{SRS}}=N_3=4$ are satisfied. Therefore, corresponding to a case in which β is equal to 1 in the formula 1, the formula 1 may be further expressed in the following form:

$$a(n_{SRS}) = \left(n_{SRS} + \left\lfloor \frac{n_{SRS}}{8} \right\rfloor + \left(\left\lfloor \frac{n_{SRS}}{4} \right\rfloor \bmod 2\right)\right) \bmod 4.$$

K is used to indicate the quantity of SRS transmission sub-bandwidths included in the SRS frequency hopping bandwidth. Therefore, when K=8, the quantity of SRS transmission sub-bandwidths included in the SRS frequency hopping bandwidth is 8. For ease of description, an SRS transmission sub-bandwidth is briefly referred to as a sub-band below. Correspondingly, for sequence numbers of antenna ports selected during 4*K=32 SRS transmissions, refer to FIG. 3. In a process of the first K SRS transmissions, the terminal device may select, from four antennas according to the foregoing antenna selection formula 1, an antenna used to transmit the SRS. When $n_{SRS}=0$, the terminal device may choose to transmit the SRS in an SRS sub-bandwidth 0 (which may also be referred to as a sub-band 0 or an SRS band 0) through an antenna port (Antenna 0) with an index of 0. When $n_{SRS}=1$, the terminal device may choose to transmit the SRS in an SRS sub-bandwidth 4 (which may also be referred to as a sub-band 4 or an SRS band 4) through an antenna port (Antenna 1) with an index of 1. When $n_{SRS}=2$, the terminal device may choose to transmit the SRS in an SRS sub-bandwidth 2 (which may also be referred to as a sub-band 2 or an SRS band 2) through an antenna port (Antenna 2) with an index of 2. When $n_{SRS}=3$, the terminal device may choose to transmit the SRS in an SRS sub-bandwidth 6 (which may also be referred to as a sub-band 6 or an SRS band 6) through an antenna port (Antenna 3) with an index of 3. For ease of description, the antenna port with the index of 0 is referred to as an antenna port 0, the antenna port with the index of 1 is referred to as an antenna port 1, the antenna port with the index of 2 is referred to as an antenna port 2, and the antenna port with the index of 3 is referred to as an antenna port 3 below. The rest may be deduced by analogy. For $n_{SRS}=4$ to $n_{SRS}=7$, antenna ports selected by the terminal device to transmit SRSs are sequentially the antenna port 1, the antenna port 2, the antenna port 3, and the antenna port 0. For $n_{SRS}=8$ to $n_{SRS}=15$, antenna ports selected by the terminal device to transmit SRSs are sequentially the antenna port 1, the antenna port 2, the antenna port 3, the antenna port 0, the antenna port 2, the antenna port 3, the antenna port 0, and the antenna port 1. For $n_{SRS}=16$ to $n_{SRS}=23$, antenna ports selected by the terminal device to transmit SRSs are sequentially the antenna port 2, the antenna port 3, the antenna port 0, the antenna port 1, the antenna port 3, the antenna port 0, the antenna port 1, and the antenna port 2. For $n_{SRS}=24$ to $n_{SRS}=31$, antenna ports selected by the terminal device to transmit SRSs are sequentially the antenna port 3, the antenna port 0, the antenna port 1, the antenna port 2, the antenna port 0, the antenna port 1, the antenna port 2, and the antenna port 3.

Based on the example in FIG. 3, according to the antenna selection formula 1 provided in the embodiments of this application, in the process of the Λ*K=32 SRS transmissions of the terminal device, Λ=4 antenna ports may send SRSs with an equal probability in each process of K=8 SRS transmissions. It can be learned from FIG. 3 that in each process of 8 SRS transmissions, each antenna port sends the SRS twice, so that each antenna port can transmit the SRS at least once in a process of 2*Λ=8 SRS transmissions. Further, four antenna ports in each column (namely, each SRS transmission sub-bandwidth) in FIG. 3 are used with an equal probability. To be specific, according to the antenna selection formula 1 provided in the embodiments of this application, each of the four antenna ports can complete one SRS transmission in any SRS transmission sub-bandwidth included in the SRS frequency hopping bandwidth. Further, it can be learned from FIG. 3 that sequence numbers of antenna ports during the first 8 SRS transmissions are the antenna port 0, the antenna port 1, the antenna port 2, the antenna port 3, the antenna port 1, the antenna port 2, the antenna port 3, and the antenna port 0. Sequence numbers of the antenna ports during the second 8 SRS transmissions are the antenna port 1, the antenna port 2, the antenna port 3, the antenna port 0, the antenna port 2, the antenna port 3, the antenna port 0, and the antenna port 1. The sequence numbers of the antenna ports during the second 8 SRS transmissions are a result of cyclic shifts of the sequence numbers of the antenna ports during the first 8 SRS transmissions, sequence numbers of antenna ports during the third 8 SRS transmissions are a result of cyclic shifts of the sequence numbers of the antenna ports during the second 8 SRS transmissions, and sequence numbers of antenna ports during the fourth 8 SRS transmissions are a result of cyclic shifts of the sequence numbers of the antenna ports during the third 8 SRS transmissions. In other words, according to the antenna selection formula 1 provided in the embodiments of this application, in the process of the 32 SRS transmissions of the terminal device, a sequence including sequence numbers of antenna ports selected during the former 8 SRS transmissions may be a result of cyclic shifts of sequence numbers of antenna ports selected during the latter 8 SRS transmissions.

Figure 4:
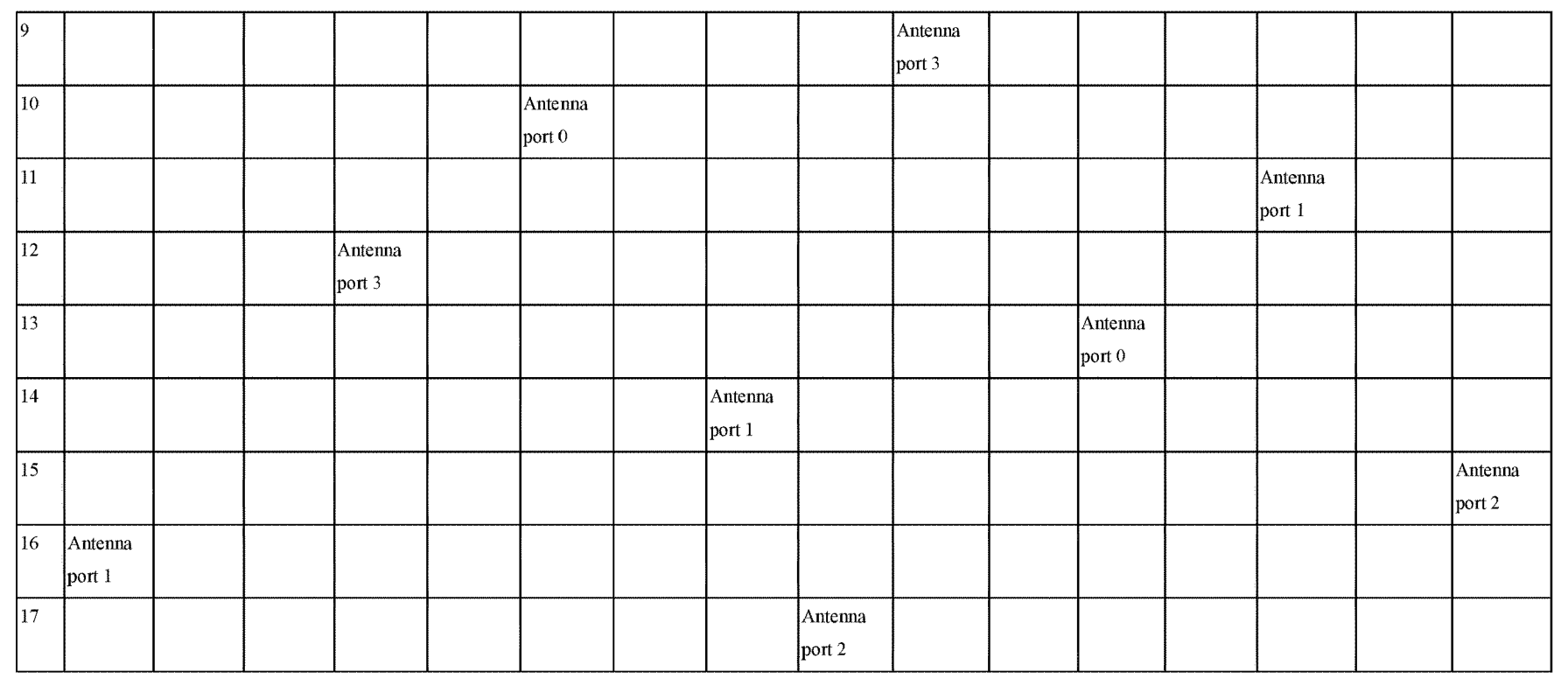
Figure 4:
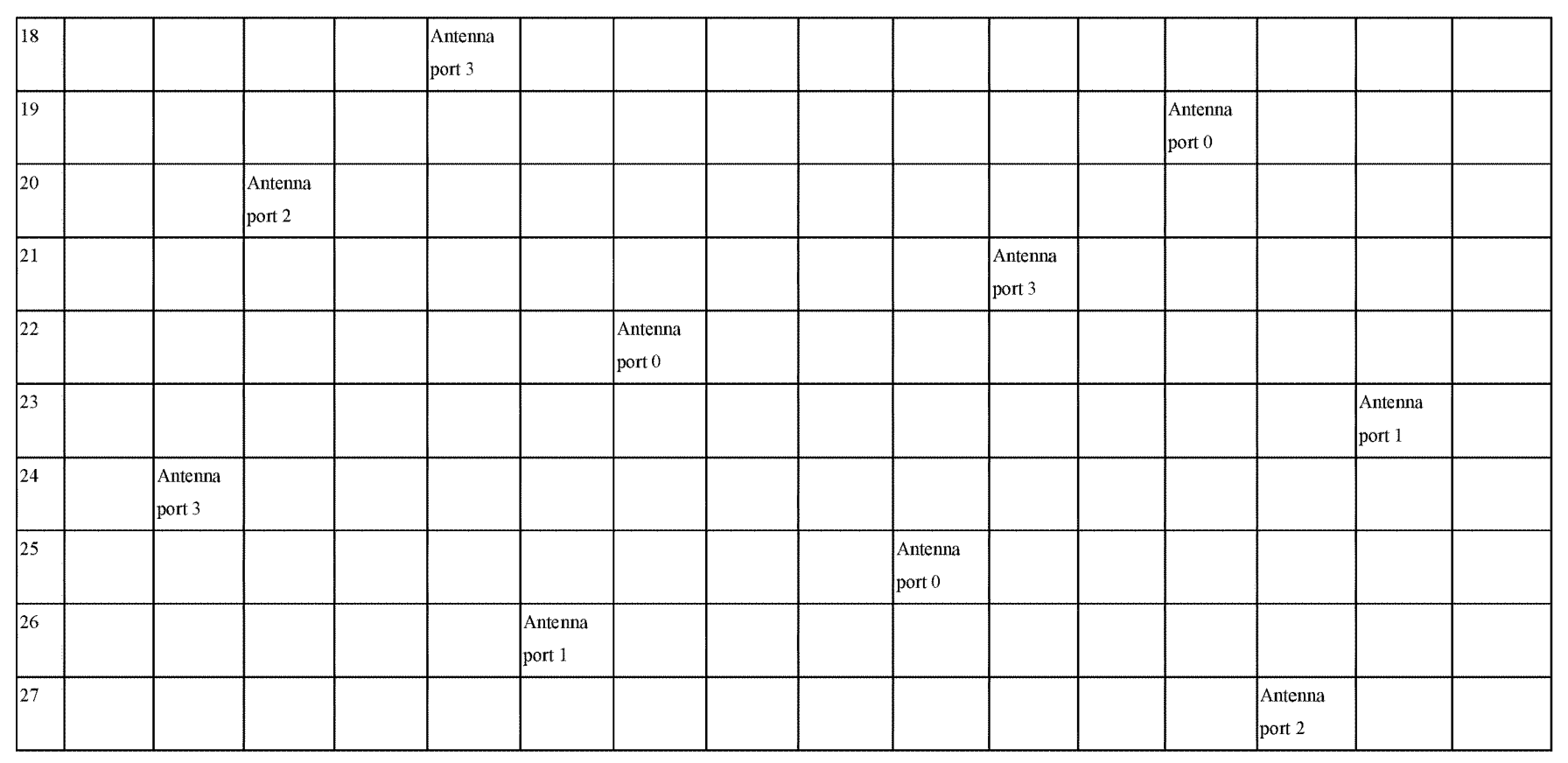
Figure 4:
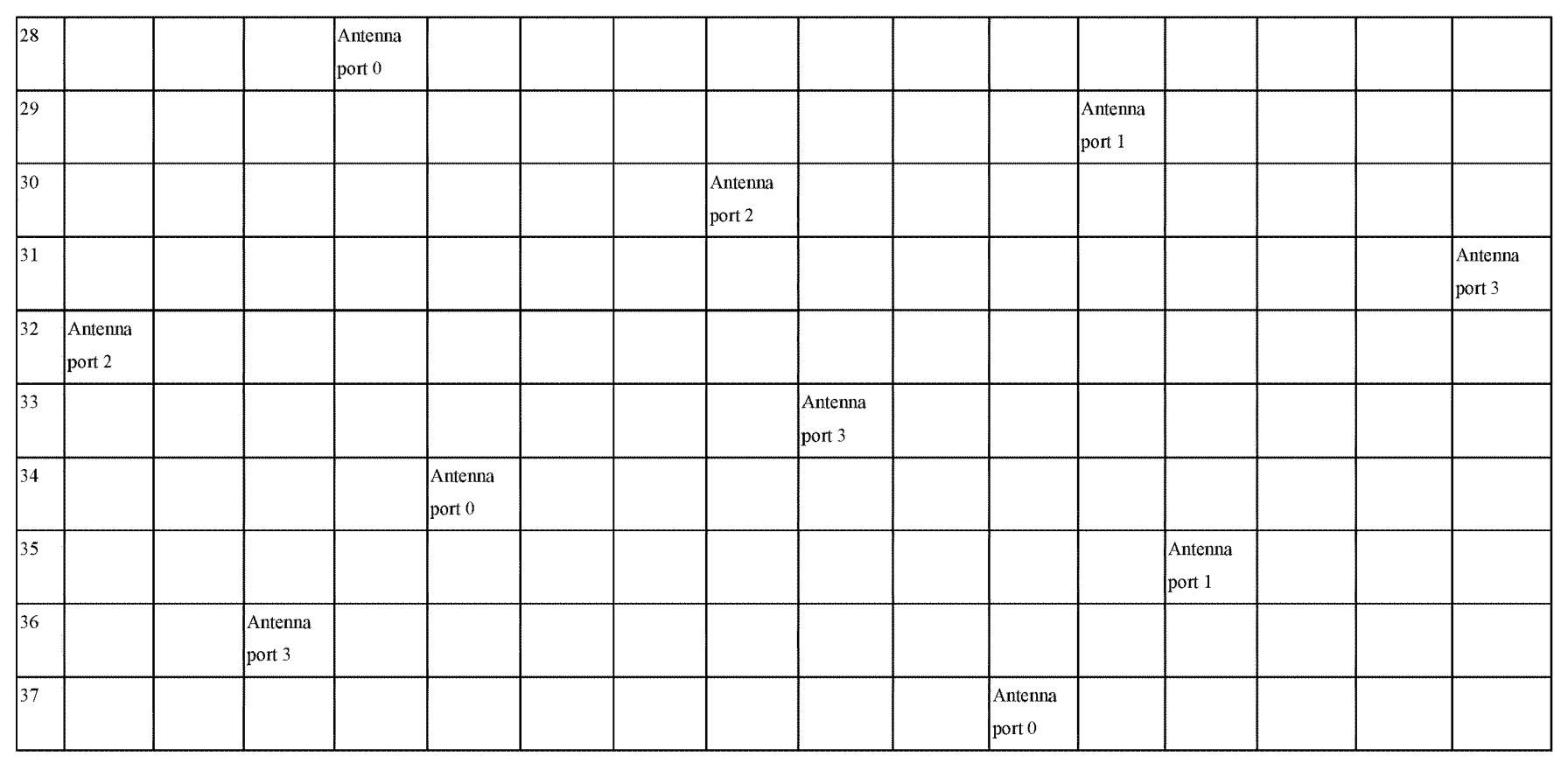
Figure 4:
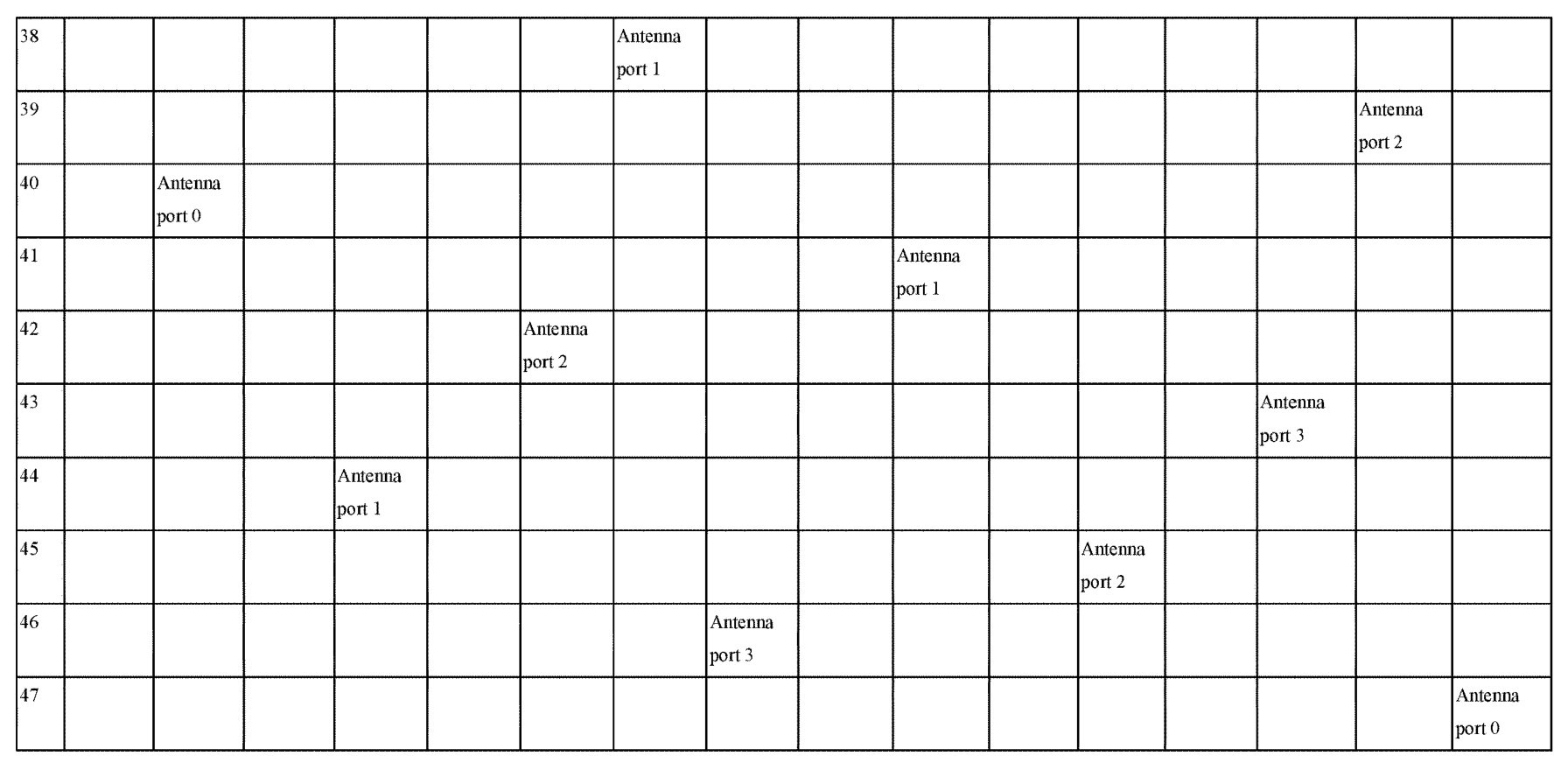

FIG. 4 is an effect diagram of selecting, according to the formula 2 provided in the embodiments of this application, an antenna port used to transmit the SRS. In FIG. 4, an example in which the quantity Λ of antenna ports is 4, the SRS configuration information includes $b_{hop}$ and $B_{SRS}$, and the SRS bandwidth configuration parameter includes $N_1$, $N_2$, and $N_3$ is used to describe in detail a method for selecting, according to the formula 2, the antenna port used to transmit the SRS. Specifically, an example in which an uplink bandwidth is 80 to 110 RBs is used. For an SRS bandwidth configuration, refer to Table 1. Assuming that a cell-level configured SRS bandwidth $C_{SRS}=4$, the terminal device may determine four SRS sub-bandwidths based on the SRS bandwidth configuration of $C_{SRS}=4$, and the four SRS sub-bandwidths correspond to four SRS-bandwidths corresponding to a row of $C_{SRS}=4$ in Table 1. It can be learned from Table 1 that in this case, correspondingly, $N_1=2$, $N_2=2$, and $N_3=4$. Assuming that the value of $b_{hop}$ is 0 and the value of $B_{SRS}$ is 3, the terminal device may calculate K in the foregoing formula 2 by using these known parameters.

$K=N_{b_{hop}}*N_1*N_2*N_3=1*2*2*4=16$ may be obtained by using the expression $K=\Pi_{b'=b_{hop}}^{B_{SRS}}N_{b'}(N_{b_{hop}}=1)$ of K.

In this case, K=16 is an even number and $N_1=N_2=2$ is satisfied. Therefore, corresponding to a case in which β is equal to 1 in the formula 2, the formula 2 may be further expressed in the following form:

$$a(n_{SRS}) = \left(n_{SRS} + \left\lfloor \frac{n_{SRS}}{16} \right\rfloor + \left(\left\lfloor \frac{n_{SRS}}{16} \right\rfloor \bmod 4\right)\right) \bmod 4.$$

K is used to indicate the quantity of SRS transmission sub-bandwidths included in the SRS frequency hopping bandwidth. Therefore, when K=16, the quantity of sub-bands included in the SRS frequency hopping bandwidth is 16. Correspondingly, for sequence numbers of antenna ports selected during 4*16=64 SRS transmissions, refer to FIG. 4. In a process of the first K SRS transmissions, the terminal device may select, from four antennas according to the foregoing antenna selection formula 2, an antenna used to transmit the SRS. When $n_{SRS}=0$, the terminal device may choose to transmit the SRS in an SRS sub-bandwidth 0 (which may also be referred to as a sub-band 0 or an SRS band 0) through an antenna port (Antenna 0) with an index of 0. When $n_{SRS}=1$, the terminal device may choose to transmit the SRS in an SRS sub-bandwidth 8 (which may also be referred to as a sub-band 8 or an SRS band 8) through an antenna port (Antenna 1) with an index of 1. When $n_{SRS}=2$, the terminal device may choose to transmit the SRS in an SRS sub-bandwidth 4 (which may also be referred to as a sub-band 4 or an SRS band 4) through an antenna port (Antenna 2) with an index of 2. By analogy, For $n_{SRS}=0$ to $n_{SRS}=15$, antenna ports selected by the terminal device to transmit SRSs are sequentially the antenna port 0, the antenna port 1, the antenna port 2, an antenna port 3, the antenna port 1, the antenna port 2, the antenna port 3, the antenna port 0, the antenna port 2, the antenna port 3, the antenna port 0, the antenna port 1, the antenna port 3, the antenna port 0, the antenna port 1, and the antenna port 2. For $n_{SRS}=16$ to $n_{SRS}=31$, antenna ports selected by the terminal device to transmit SRSs are sequentially the antenna port 1, the antenna port 2, the antenna port 3, the antenna port 0, the antenna port 2, the antenna port 3, the antenna port 0, the antenna port 1, the antenna port 3, the antenna port 0, the antenna port 1, the antenna port 2, the antenna port 0, the antenna port 1, the antenna port 2, and the antenna port 3. For $n_{SRS}=32$ to $n_{SRS}=47$, antenna ports selected by the terminal device to transmit SRSs are sequentially the antenna port 2, the antenna port 3, the antenna port 0, the antenna port 1, the antenna port 3, the antenna port 0, the antenna port 1, the antenna port 2, the antenna port 0, the antenna port 1, the antenna port 2, the antenna port 3, the antenna port 1, the antenna port 2, the antenna port 3, and the antenna port 0. For $n_{SRS}=48$ to $n_{SRS}=63$, antenna ports selected by the terminal device to transmit SRSs are sequentially the antenna port 3, the antenna port 0, the antenna port 1, the antenna port 2, the antenna port 0, the antenna port 1, the antenna port 2, the antenna port 3, the antenna port 1, the antenna port 2, the antenna port 3, the antenna port 0, the antenna port 2, the antenna port 3, the antenna port 0, and the antenna port 1.

Based on the example in FIG. 4, according to the antenna selection formula 2 provided in the embodiments of this application, in the process of the Λ*K=64 SRS transmissions of the terminal device, four antenna ports may send SRSs with an equal probability in each process of K=16 SRS transmissions. It can be learned from FIG. 4 that in each process of 16 SRS transmissions of the terminal device, each antenna port sends the SRS four times. Further, four antenna ports in each column (namely, each SRS transmission sub-bandwidth) in FIG. 4 are used with an equal probability. To be specific, according to the antenna selection formula 2 provided in the embodiments of this application, each of the four antenna ports can complete one SRS transmission in any SRS transmission sub-bandwidth included in the SRS frequency hopping bandwidth. Further, it can be learned from FIG. 4 that sequence numbers of the antenna ports during the first 16 SRS transmissions are the antenna port 0, the antenna port 1, the antenna port 2, the antenna port 3, the antenna port 1, the antenna port 2, the antenna port 3, the antenna port 0, the antenna port 2, the antenna port 3, the antenna port 0, the antenna port 1, the antenna port 3, the antenna port 0, the antenna port 1, and the antenna port 2. Sequence numbers of the antenna ports during the second 16 SRS transmissions are the antenna port 1, the antenna port 2, the antenna port 3, the antenna port 0, the antenna port 2, the antenna port 3, the antenna port 0, the antenna port 1, the antenna port 3, the antenna port 0, the antenna port 1, the antenna port 2, the antenna port 0, the antenna port 1, the antenna port 2, and the antenna port 3. The sequence numbers of the antenna ports during the second 16 SRS transmissions are a result of cyclic shifts of the sequence numbers of the antenna ports during the first 16 SRS transmissions, sequence numbers of antenna ports during the third 16 SRS transmissions are a result of cyclic shifts of the sequence numbers of the antenna ports during the second 16 SRS transmissions, and sequence numbers of antenna ports during the fourth 16 SRS transmissions are a result of cyclic shifts of the sequence numbers of the antenna ports during the third 16 SRS transmissions. In other words, according to the antenna selection formula 2 provided in the embodiments of this application, in the process of the 64 SRS transmissions of the terminal device, a sequence including sequence numbers of antenna ports selected during the former 16 SRS transmissions may be a result of cyclic shifts of sequence numbers of antenna ports selected during the latter 16 SRS transmissions.

FIG. 5 is an effect diagram of selecting, according to the formula 3 provided in the embodiments of this application, an antenna port used to transmit the SRS. In FIG. 5, an example in which the quantity Λ of antenna ports is 4, the SRS configuration information includes $b_{hop}$ and $B_{SRS}$, where the value of $b_{hop}$ is 1 and the value of $B_{SRS}$ is 3, and an SRS bandwidth configuration parameter includes $N_2$ and $N_3$, where $N_2=2$ and $N_3=4$ is used for description.

The terminal device may calculate K in the foregoing formula 3 by using the foregoing parameters.

$K=N_{b_{hop}}*N_2*N_3=1*2*4=8$ may be obtained by using the expression $K=\Pi_{b'=b_{hop}}^{B_{SRS}}N_{b'}(N_{b_{hop}}=1)$ of K.

In this case, K=8 is an even number, and $B_{SRS}=b_{hop}+2$ and $N_{b_{hop}+1}=2$, $N_{SRS}=4$ are satisfied. Therefore, corresponding to a case in which a is equal to 1 and f is equal to 1 in the formula 3, the formula 3 may be further expressed in the following form:

$$a(n_{SRS}) = \left(n_{SRS} + \left\lfloor \frac{n_{SRS}}{16} \right\rfloor + \left\lfloor \frac{n_{SRS}}{4} \right\rfloor \right) \bmod 4.$$

K is used to indicate the quantity of SRS transmission sub-bandwidths included in the SRS frequency hopping bandwidth. Therefore, when K=8, the quantity of sub-bands included in the SRS frequency hopping bandwidth is 8. Correspondingly, for sequence numbers of antenna ports selected during 4K=32 SRS transmissions, refer to FIG. 5. In a process of the first K SRS transmissions, the terminal device may select, from four antennas according to the foregoing antenna selection formula 3, an antenna used to transmit the SRS. When $n_{SRS}$=0, the terminal device may choose to transmit the SRS in an SRS sub-bandwidth 0 (which may also be referred to as a sub-band 0 or an SRS band 0) through an antenna port 0. When $n_{SRS}$=1, the terminal device may choose to transmit the SRS in an SRS sub-bandwidth 4 (which may also be referred to as a sub-band 4 or an SRS band 4) through an antenna port 1. When $n_{SRS}$=2, the terminal device may choose to transmit the SRS in an SRS sub-bandwidth 2 (which may also be referred to as a sub-band 2 or an SRS band 2) through an antenna port 2. When $n_{SRS}$=3, the terminal device may choose to transmit the SRS in an SRS sub-bandwidth 6 (which may also be referred to as a sub-band 6 or an SRS band 6) through an antenna port 3. The rest may be deduced by analogy. For $n_{SRS}$=4 to $n_{SRS}$=7, antenna ports selected by the terminal device to transmit SRSs are sequentially the antenna port 1, the antenna port 2, the antenna port 3, and the antenna port 0. For $n_{SRS}$=8 to $n_{SRS}$=15, antenna ports selected by the terminal device to transmit SRSs are sequentially the antenna port 3, the antenna port 0, the antenna port 1, the antenna port 2, the antenna port 0, the antenna port 1, the antenna port 2, and the antenna port 3. For $n_{SRS}$=16 to $n_{SRS}$=23, antenna ports selected by the terminal device to transmit SRSs are sequentially the antenna port 2, the antenna port 3, the antenna port 0, the antenna port 1, the antenna port 3, the antenna port 0, the antenna port 1, and the antenna port 2. For $n_{SRS}$=24 to $n_{SRS}$=31, antenna ports selected by the terminal device to transmit SRSs are sequentially the antenna port 1, the antenna port 2, the antenna port 3, the antenna port 0, the antenna port 2, the antenna port 3, the antenna port 0, and the antenna port 1.

Based on the example in FIG. 5, according to the antenna selection formula 3 provided in the embodiments of this application, in the process of the Λ*K=32 SRS transmissions of the terminal device, four antenna ports may send SRSs with an equal probability in each process of K=8 SRS transmissions. It can be learned from FIG. 5 that in each process of 8 SRS transmissions, each antenna port sends the SRS twice. Further, four antenna ports in each column (namely, each SRS transmission sub-bandwidth) in FIG. 5 are used with an equal probability. To be specific, according to the antenna selection formula 3 provided in the embodiments of this application, each of the four antenna ports can complete one SRS transmission in any SRS transmission sub-bandwidth included in the SRS frequency hopping bandwidth. Further, it can be learned from FIG. 5 that sequence numbers of antenna ports during the first 8 SRS transmissions are the antenna port 0, the antenna port 1, the antenna port 2, the antenna port 3, the antenna port 1, the antenna port 2, the antenna port 3, and the antenna port 0. Sequence numbers of the antenna ports during the second 8 SRS transmissions are the antenna port 3, the antenna port 0, the antenna port 1, the antenna port 2, the antenna port 0, the antenna port 1, the antenna port 2, and the antenna port 3. The sequence numbers of the antenna ports during the second 8 SRS transmissions are a result of cyclic shifts of the sequence numbers of the antenna ports during the first 8 SRS transmissions, sequence numbers of antenna ports during the third 8 SRS transmissions are a result of cyclic shifts of the sequence numbers of the antenna ports during the second 8 SRS transmissions, and sequence numbers of antenna ports during the fourth 8 SRS transmissions are a result of cyclic shifts of the sequence numbers of the antenna ports during the third 8 SRS transmissions. In other words, according to the antenna selection formula 3 provided in the embodiments of this application, in the process of the 32 SRS transmissions of the terminal device, a sequence including sequence numbers of antenna ports selected during the former 8 SRS transmissions may be a result of cyclic shifts of sequence numbers of antenna ports selected during the latter 8 SRS transmissions.

Based on a same inventive concept as the method embodiment, an embodiment of this application further provides a terminal device. It may be understood that to implement the foregoing functions, the terminal device includes corresponding hardware structures and/or software modules for performing the functions. Persons of ordinary skill in the art should easily be aware that, in combination with the examples described in the embodiments disclosed in this specification, algorithms steps can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 6:
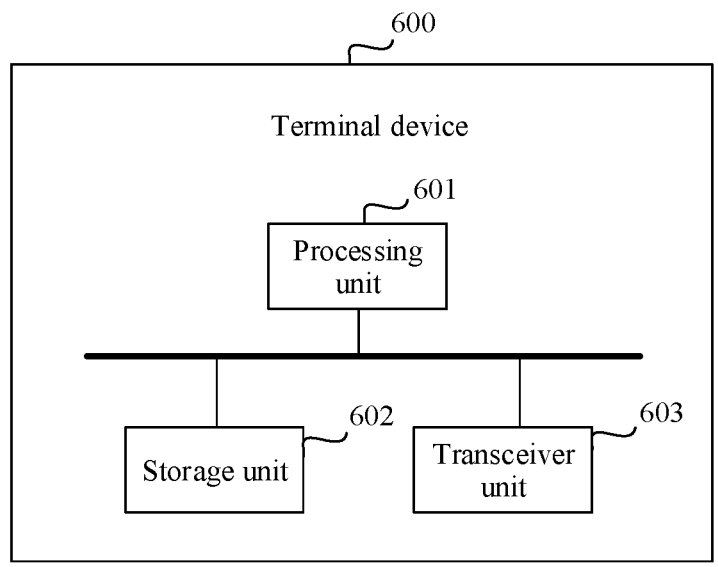
FIG. 6 is a schematic structural diagram of a terminal device according to an embodiment of this application.

When an integrated unit is used, FIG. 6 is a possible schematic structural diagram of a terminal device according to an embodiment of this application. As shown in FIG. 6, the terminal device 600 includes a processing unit 601, a storage unit 602, and a transceiver unit 603. The processing unit 601 is configured to control and manage an action of the terminal device 600. For example, the processing unit 601 may be configured to perform technical processes such as S120 and S130 in FIG. 2. The transceiver unit 603 is configured to support the terminal device 600 in communicating with another network entity, for example, may be configured to perform technical processes such as S110 and S140 in FIG. 2. The terminal device 600 may further include the storage unit 602, configured to store program code and data of the terminal device 600.

The processing unit 601 may be a processor or a controller, such as a general-purpose central processing unit (central processing unit, CPU), a general-purpose processor, digital signal processing (digital signal processing, DSP), an application-specific integrated circuit (application specific integrated circuits, ASIC), a field programmable gate array (field programmable gate array, FPGA), or another programmable logical device, a transistor logical device, a hardware component, or any combination thereof. The processor/controller may implement or execute various example logical blocks, modules, and circuits described with reference to content disclosed in the present invention. The processor may alternatively be a combination of processors implementing a computing function, for example, a combination of one or more microprocessors, or a combination of the DSP and a microprocessor. The transceiver unit 603 may be a radio frequency chip, a radio frequency circuit, or the like. The storage unit 602 may be a memory, and may be a RAM (random-access memory, random-access memory), a ROM (read-only memory, read-only memory), or the like.

Figure 7:
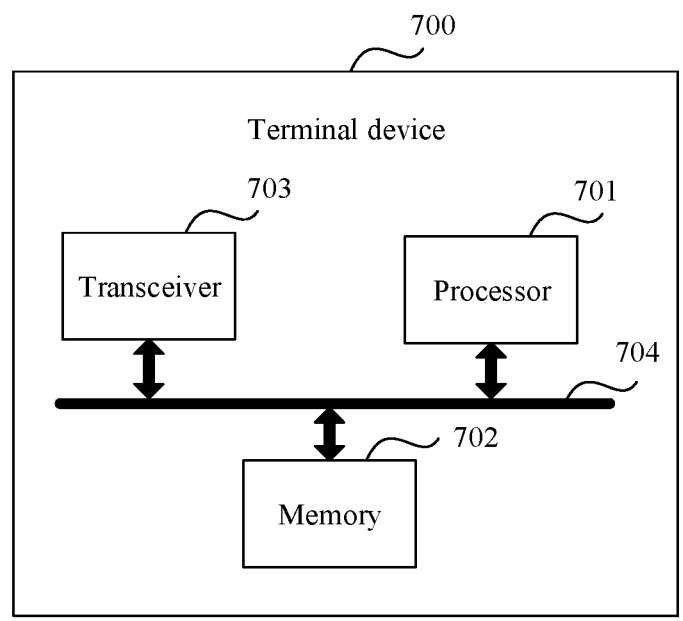
FIG. 7 is a schematic structural diagram of another terminal device according to an embodiment of this application.

When the processing unit 601 is a processor, the transceiver unit 603 is a transceiver, and the storage unit 602 is a memory, the terminal device 600 in this embodiment of the present invention may be a terminal device shown in FIG. 7.

FIG. 7 is a schematic diagram of a possible logical structure of the terminal device in the foregoing embodiment according to an embodiment of this application. As shown in FIG. 7, the terminal device 700 may include at least one processor 701. In this embodiment of this application, the processor 701 is configured to control and manage an action of the device. Optionally, the device may further include a memory 702 and a transceiver 703. The processor 701, the memory 702, and the transceiver 703 may be connected to each other, or may be connected to each other by using a bus 704. The memory 702 is configured to store code and data of the device. The transceiver 703 is configured to support the device in communicating with another network device.

The following describes components of the terminal device 700 in detail.

The processor 701 is a control center of the device, and may be one processor, or may be a collective name of a plurality of processing elements. For example, the processor 701 may be a CPU, may be implemented in an ASIC manner, or one or more integrated circuits configured to implement this embodiment of the present invention, for example, one or more DSPs, or one or more FPGAs.

The processor 701 may run or execute a software program stored in the memory 702 and invoke data stored in the memory 702, to perform various functions of the device 700.

The memory 702 may be a read-only memory (read-only memory, ROM) or another type of static storage device that can store static information and instructions, or a random access memory (random access memory, RAM) or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory 702 may exist independently, and is connected to the processor 701 by using the communications bus 704. Alternatively, the memory 702 may be integrated with the processor 701.

The transceiver 703 is configured to communicate with another node, for example, a network device. The transceiver 703 may be further configured to communicate with a communications network, such as the Ethernet, a radio access network (radio access network, RAN), or a wireless local area network (wireless local area networks, WLAN).

The communications bus 704 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 7, but this does not mean that there is only one bus or only one type of bus.

A structure of the device shown in FIG. 7 does not constitute a limitation on the terminal device. The terminal device may include components more or fewer than those shown in the figure, or may combine some components, or may have different component arrangements.

In the terminal device 700 shown in FIG. 7, the processor 701 invokes and executes a computer program stored in the memory 702, and may complete a specific process of each embodiment in the foregoing method embodiment by using the transceiver 703. Details are not described herein one by one.

Based on a same concept as the foregoing method embodiment, an embodiment of this application further provides a computer storage medium. The computer storage medium stores a computer-executable instruction. When the computer-executable instruction is invoked by a computer, the computer is enabled to perform a specific process of each embodiment in the foregoing provided method embodiment. In this embodiment of this application, the computer-readable storage medium is not limited. For example, the computer-readable storage medium may be a RAM (random-access memory, random access memory) or a ROM (read-only memory, read-only memory).

Based on a same concept as the foregoing method embodiment, an embodiment of this application further provides a computer program product. The computer program product stores an instruction. When the instruction is run on a computer, the computer is enabled to perform the method provided in any one of the foregoing possible designs.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the following claims are intended to be construed as to cover the embodiments of this application and all changes and modifications falling within the scope of this application.

Clearly, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   receiving, by a terminal device, sounding reference signal (SRS) configuration information from a network device;
   determining, by the terminal device and based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS, wherein $n_{SRS}$ is an integer greater than or equal to 0, $\Lambda$ is a positive integer greater than or equal to 4, and a symbol * indicates a multiplication operation, wherein the SRS configuration information comprises one or both of $b_{hop}$ and $B_{SRS}$, and the SRS bandwidth configuration parameter comprises one or more of $N_1$, $N_2$, and $N_3$, wherein
   each of $b_{hop}$, and $B_{SRS}$ is any value in {0, 1, 2, 3}, $N_1$, $N_2$, and $N_3$ are positive integers, $N_1$ indicates a quantity of second-level sub-bandwidths into which a first-level sub-bandwidth is divided, $N_2$ indicates a quantity of third-level sub-bandwidths into which a second-level sub-bandwidth is divided, and $N_3$ indicates a quantity of fourth-level sub-bandwidths into which a third-level sub-bandwidth is divided, wherein
   a value of $B_{SRS}$ being 0 indicates that an SRS transmission sub-bandwidth is a first-level sub-bandwidth, a value of $B_{SRS}$ being 1 indicates that an SRS transmission sub-bandwidth is a second-level sub-bandwidth, a value of $B_{SRS}$ being 2 indicates that an SRS transmission sub-bandwidth is a third-level sub-bandwidth, or a value of $B_{SRS}$ being 3 indicates that an SRS transmission sub-bandwidth is a fourth-level sub-bandwidth, wherein
   a value of $b_{hop}$ being 0 indicates that an SRS frequency hopping bandwidth is a first-level sub-bandwidth, a value of $b_{hop}$ being 1 indicates that an SRS frequency hopping bandwidth is a second-level sub-bandwidth, a value of $b_{hop}$ being 2 indicates that an SRS frequency hopping bandwidth is a third-level sub-bandwidth, or a value of $b_{hop}$ being 3 indicates that an SRS frequency hopping bandwidth is a fourth-level sub-bandwidth, and wherein
   the value of $b_{hop}$ is less than or equal to the value of $B_{SRS}$; and
   wherein the determining, by the terminal device and based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS comprises:
   when $\Pi_{b'=b_{hop}}^{B_{SRS}} N_{b'}(N_{b_{hop}}=1)$ is an odd number, determining, by the terminal device based on $n_{SRS}$ and $\Lambda$, the index $\alpha(n_{SRS})$ corresponding to the antenna port used to transmit the SRS: or
   when $\Pi_{b'=b_{hop}}^{B_{SRS}} N_{b'}(N_{b_{hop}}=1)$ is an even number, determining, by the terminal device based on at least one of $n_{SRS}$, $$\left\lfloor \frac{n_{SRS}}{\max\left(\Lambda, \prod_{b'=b_{hop}}^{B_{SRS}} N_{b'}(N_{b_{hop}}=1)\right)} \right\rfloor, \text{ and } \left\lfloor \frac{n_{SRS}}{\Lambda} \right\rfloor,$$

the index $\alpha(n_{SRS})$ corresponding to the antenna port used to transmit the SRS, wherein
$\max(\Lambda, \Pi_{b'=b_{hop}}^{B_{SRS}} N_{b'}(N_{b_{hop}}=1))$ indicates a larger one of $\Lambda$ and $\Pi_{b'=b_{hop}}^{B_{SRS}} N_{b'}(N_{b_{hop}}=1)$, and a symbol $\lfloor \ \rfloor$ indicates rounding down; and
wherein the index number $\alpha(n_{SRS})$ of the antenna port used by the terminal device to transmit the SRS satisfies the following formulas:

$$a(n_{SRS}) = \begin{cases} (n_{SRS} + \alpha \cdot \lfloor n_{SRS}/\max(\Lambda, K) \rfloor + \beta \cdot \lfloor n_{SRS}/\Lambda \rfloor) \bmod \Lambda \\ \quad \text{when } K \text{ is an even number} \\ n_{SRS} \bmod \Lambda \quad \text{when } K \text{ is an odd number} \end{cases}$$

wherein
$K = \Pi_{b'=b_{hop}}^{B_{SRS}} N_{b'}(N_{b_{hop}}=1)$, a symbol mod indicates a modulo budget, $$\alpha = \begin{cases} 0 & \text{when}\{B_{SRS} = b_{hop} + 3, N_{b_{hop}+1} = N_{b_{hop}+2} = 2, \\ & N_{B_{SRS}} \text{ is an odd number}\} \text{ or } \{N_{b_{hop}+1} = 2, N_{B_{SRS}} = 6\}, \text{ and} \\ 1 & \text{others} \end{cases}$$

$$\beta = \begin{cases} 1 & \text{when } \{B_{SRS} = b_{hop} + 3, N_{b_{hop}+1} = N_{b_{hop}+2} = 2\} \text{ or} \\ & \{N_{b_{hop}+1} = 2, N_{B_{SRS}} = 4\} \\ 0 & \text{others} \end{cases};$$

selecting, by the terminal device, the antenna port with the index of $\alpha(n_{SRS})$ from indexes corresponding to the $\Lambda$ antenna ports; and
transmitting, by the terminal device, the SRS through the antenna port with the index of $\alpha(n_{SRS})$ during an $n_{SRS}^{th}$ SRS transmission.

2. The method according to claim 1, wherein $N_1=N_2=2$, or $b_{hop}=1$, $B_{SRS}=3$, $N_2=2$, and $N_3=4$, and wherein the determining, by the terminal device and based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS comprises:

determining, by the terminal device and based on the sequence number $n_{SRS}$ of the quantity of SRS transmissions, the quantity $\Lambda$ of antenna ports, $N_1$, and $N_2$ or based on the sequence number $n_{SRS}$ of the quantity of SRS transmissions, the quantity $\Lambda$ of antenna ports, $b_{hop}$, $B_{SRS}$, $N_2$, and $N_3$, the index $\alpha(n_{SRS})$ corresponding to the antenna port used to transmit the SRS, wherein the index $\alpha(n_{SRS})$ corresponding to the antenna port used to transmit the SRS for an $n_{SRS}$th time is different from an index $\alpha(n_{SRS}+\Lambda)$ corresponding to an antenna port used to transmit the SRS for an $(n_{SRS}+\Lambda)^{th}$ time.

3. A terminal device, comprising:
at least one processor; and
a memory coupled to the at least one processor and storing programming instructions for execution by the at least one processor, wherein the programming instructions, when executed, cause the terminal device to perform operations comprising:
receiving sounding reference signal (SRS) configuration information from a network device;
determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS, wherein $n_{SRS}$ is an integer greater than or equal to 0, $\Lambda$ is a positive integer greater than or equal to 4, and a symbol * indicates a multiplication operation, wherein the SRS configuration information comprises one or both of $b_{hop}$, and $B_{SRS}$, and the SRS bandwidth configuration parameter comprises one or more of $N_1$, $N_2$, and $N_3$, wherein
each of $b_{hop}$, and $B_{SRS}$ is any value in {0, 1, 2, 3}, $N_1$, $N_2$, and $N_3$ are positive integers, $N_1$ indicates a quantity of second-level sub-bandwidths into which a first-level sub-bandwidth is divided, $N_2$ indicates a quantity of third-level sub-bandwidths into which a second-level sub-bandwidth is divided, and $N_3$ indicates a quantity of fourth-level sub-bandwidths into which a third-level sub-bandwidth is divided, wherein
a value of $B_{SRS}$ being 0 indicates that an SRS transmission sub-bandwidth is a first-level sub-bandwidth, a value of $B_{SRS}$ being 1 indicates that an SRS transmission sub-bandwidth is a second-level sub-bandwidth, a value of $B_{SRS}$ being 2 indicates that an SRS transmission sub-bandwidth is a third-level sub-bandwidth, or a value of $B_{SRS}$ being 3 indicates that an SRS transmission sub-bandwidth is a fourth-level sub-bandwidth, wherein
a value of $b_{hop}$, being 0 indicates that an SRS frequency hopping bandwidth is a first-level sub-bandwidth, a value of $b_{hop}$ being 1 indicates that an SRS frequency hopping bandwidth is a second-level sub-bandwidth, a value of $b_{hop}$ being 2 indicates that an SRS frequency hopping bandwidth is a third-level sub-bandwidth, or a value of $b_{hop}$ being 3 indicates that an SRS frequency hopping bandwidth is a fourth-level sub-bandwidth, and wherein the value of $b_{hop}$ is less than or equal to the value of $B_{SRS}$; and wherein the determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS comprises:

when $\Pi_{b'=b_{hop}}^{B_{SRS}} N_{b'}(N_{b_{hop}}=1)$ is an odd number, determining, based on $n_{SRS}$ and $\Lambda$, the index $\alpha(n_{SRS})$ corresponding to the antenna port used to transmit the SRS: or when $\Pi_{b'=b_{hop}}^{B_{SRS}} N_{b'}(N_{b_{hop}}=1)$ is an even number, determining, based on at last one of $n_{SRS}$, $$\left\lfloor \frac{n_{SRS}}{\max\left(\Lambda, \prod_{b'=b_{hop}}^{B_{SRS}} N_{b'}(N_{b_{hop}}=1)\right)} \right\rfloor, \text{ and } \left\lfloor \frac{n_{SRS}}{\Lambda} \right\rfloor,$$

and the index $\alpha(n_{SRS})$ corresponding to the antenna port used to transmit the SRS, wherein
$\max(\Lambda, \Pi_{b'=b_{hop}}^{B_{SRS}} N_{b'}(N_{b_{hop}}=1))$ indicates a larger one of $\Lambda$ and $\Pi_{b'=b_{hop}}^{B_{SRS}} N_{b'}(N_{b_{hop}}=1)$ and a symbol $\lfloor \rfloor$ indicates rounding down; and wherein the index number $\alpha(n_{SRS})$ of the antenna port used by the terminal device to transmit the SRS satisfies the following formulas:

$$a(n_{SRS}) = \begin{cases} (n_{SRS} + \alpha \cdot \lfloor n_{SRS}/\max(\Lambda, K) \rfloor + \beta \cdot \lfloor n_{SRS}/\Lambda \rfloor) \bmod \Lambda \\ \qquad \text{when } K \text{ is an even number} \\ n_{SRS} \bmod \Lambda \quad \text{when } K \text{ is an odd number} \end{cases},$$

wherein
$K=\Pi_{b'=b_{hop}}^{B_{SRS}} N_{b'}(N_{b_{hop}}=1)$ a symbol mod indicates a modulo budget, $$\alpha = \begin{cases} 0 & \text{when}\{B_{SRS} = b_{hop} + 3, N_{b_{hop}+1} = N_{b_{hop}+2} = 2, \\ N_{B_{SRS}} \text{ is an odd number}\} \text{ or } \{N_{b_{hop}+1} = 2, N_{B_{SRS}} = 6\}, \text{ and} \\ 1 & \text{others} \end{cases}$$

$$\beta = \begin{cases} 1 & \text{when } \{B_{SRS} = b_{hop} + 3, N_{b_{hop}+1} = N_{b_{hop}+2} = 2\} \text{ or} \\ & \{N_{b_{hop}+1} = 2, N_{B_{SRS}} = 4\} \\ 0 & \text{others} \end{cases};$$

selecting the antenna port with the index of $\alpha(n_{SRS})$ from indexes corresponding to the $\Lambda$ antenna ports; and
transmitting the SRS through the antenna port with the index of $\alpha(n_{SRS})$ during an $n_{SRS}^{th}$ transmission.

4. The terminal device according to claim 3, wherein $N_1=N_2=2$, or $b_{hop}=1$, $B_{SRS}=3$, $N_2=2$, and $N_3=4$, and wherein
the determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS comprises:
determining, based on the sequence number $n_{SRS}$ of the quantity of SRS transmissions, the quantity $\Lambda$ of antenna ports, $N_1$, and $N_2$ or based on the sequence number $n_{SRS}$ of the quantity of SRS transmissions, the quantity $\Lambda$ of antenna ports, $b_{hop}$, $B_{SRS}$, $N_2$, and $N_3$, the index $\alpha(n_{SRS})$ corresponding to the antenna port used to transmit the SRS, wherein the index $\alpha(n_{SRS})$ corresponding to the antenna port used to transmit the SRS for an $n_{SRS}{}^{th}$ time is different from an index $\alpha(n_{SRS}+\Lambda)$ corresponding to an antenna port used to transmit the SRS for an $(n_{SRS}+\Lambda)$ time.

5. A non-transitory computer readable medium, comprising a computer program which, when executed by one or more processors, causes the one or more processors to perform operation comprising:

receiving sounding reference signal (SRS) configuration information from a network device;

determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS, wherein $n_{SRS}$ is an integer greater than or equal to 0, $\Lambda$ is a positive integer greater than or equal to 4, and a symbol * indicates a multiplication operation, wherein the SRS configuration information comprises one or both of $b_{hop}$ and $B_{SRS}$, and the SRS bandwidth configuration parameter comprises one or more of $N_1$, $N_2$, and $N_3$, wherein each of $b_{hop}$ and $B_{SRS}$ is any value in $\{0, 1, 2, 3\}$, $N_1$, $N_2$, and $N_3$ are positive integers, $N_1$ indicates a quantity of second-level sub-bandwidths into which a first-level sub-bandwidth is divided, $N_2$ indicates a quantity of third-level sub-bandwidths into which a second-level sub-bandwidth is divided, and $N_3$ indicates a quantity of fourth-level sub-bandwidths into which a third-level sub-bandwidth is divided, wherein a value of $B_{SRS}$ being 0 indicates that an SRS transmission sub-bandwidth is a first-level sub-bandwidth, a value of $B_{SRS}$ being 1 indicates that an SRS transmission sub-bandwidth is a second-level sub-bandwidth, a value of $B_{SRS}$ being 2 indicates that an SRS transmission sub-bandwidth is a third-level sub-bandwidth, or a value of $B_{SRS}$S being 3 indicates that an SRS transmission sub-bandwidth is a fourth-level sub-bandwidth, wherein a value of $b_{hop}$ being 0 indicates that an SRS frequency hopping bandwidth is a first-level sub-bandwidth, a value of $b_{hop}$ being 1 indicates that an SRS frequency hopping bandwidth is a second-level sub-bandwidth, a value of $b_{hop}$ being 2 indicates that an SRS frequency hopping bandwidth is a third-level sub-bandwidth, or a value of $b_{hop}$ being 3 indicates that an SRS frequency hopping bandwidth is a fourth-level sub-bandwidth, and wherein the value of $b_{hop}$, is less than or equal to the value of $B_{SRS}$; and wherein the determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS comprises:

when $\Pi_{b'=b_{hop}}^{B_{SRS}} N_{b'}(N_{b_{hop}}=1)$ is an odd number, determining, based on $n_{SRS}$ and $\Lambda$, the index $\alpha(n_{SRS})$ corresponding to the antenna port used to transmit the SRS; or when $\Pi_{b'=b_{hop}}^{B_{SRS}} N_{b'}(N_{b_{hop}}=1)$ is an even number, determining, based on at least one of $n_{SRS}$, $$\left\lfloor \frac{n_{SRS}}{\max\left(\Lambda,\ \prod_{b'=b_{hop}}^{B_{SRS}} N_{b'}(N_{b_{hop}}=1)\right)} \right\rfloor, \text{ and } \left\lfloor \frac{n_{SRS}}{\Lambda} \right\rfloor,$$

the index $\alpha(n_{SRS})$ corresponding to the antenna port used to transmit the SRS, wherein $\max(\Lambda,\ \Pi_{b'=b_{hop}}^{B_{SRS}} N_{b'}(N_{b_{hop}}=1))$ indicates a larger one of $\Lambda$ and $\Pi_{b'=b_{hop}}^{B_{SRS}} N_{b'}(N_{b_{hop}}=1)$, and a symbol $\lfloor\ \rfloor$ indicates rounding down; and wherein the index number $\alpha(n_{SRS})$ of the antenna port used to transmit the SRS satisfies the following formulas:

$$a(n_{SRS}) = \begin{cases} (n_{SRS} + \alpha \cdot \lfloor n_{SRS} / \max(\Lambda, K)\rfloor + \beta \cdot \lfloor n_{SRS}/\Lambda \rfloor) \bmod \Lambda \\ \quad \text{when } K \text{ is an even number} \\ n_{SRS} \bmod \Lambda \quad \text{when } K \text{ is an odd number} \end{cases},$$

wherein
$K = \Pi_{b'=b_{hop}}^{B_{SRS}} N_{b'}(N_{b_{hop}}=1)$ a, symbol mod indicates a modulo budget, $$\alpha = \begin{cases} 0 & \text{when}\{B_{SRS} = b_{hop}+3, N_{b_{hop}+1} = N_{b_{hop}+2} = 2, \\ & N_{B_{SRS}} \text{ is an odd number}\} \text{ or } \{N_{b_{hop}+1}=2, N_{B_{SRS}}=6\}, \text{ and} \\ 1 & \text{others} \end{cases}$$

$$\beta = \begin{cases} 1 & \text{when } \{B_{SRS} = b_{hop}+3, N_{b_{hop}+1} = N_{b_{hop}+2} = 2\} \text{ or} \\ & \{N_{b_{hop}+1}=2, N_{B_{SRS}}=4\} \\ 0 & \text{others} \end{cases};$$

selecting the antenna port with the index of $\alpha(n_{SRS})$ from indexes corresponding to the $\Lambda$ antenna ports; and transmitting the SRS through the antenna port with the index of $\alpha(n_{SRS})$ during an $n_{SRS}{}^{th}$ SRS transmission.

6. The non-transitory computer readable medium according to claim 5, wherein $N_1=N_2=2$, or $b_{hop}=1$, $B_{SRS}=3$, $N_2=2$, and $N_3=4$, and wherein the determining, based on one or more of an SRS bandwidth configuration parameter, a sequence number $n_{SRS}$ of a quantity of SRS transmissions, a quantity $\Lambda$ of antenna ports, and the received SRS configuration information, an index $\alpha(n_{SRS})$ corresponding to an antenna port used to transmit an SRS comprises:

determining, based on the sequence number $n_{SRS}$ of the quantity of SRS transmissions, the quantity $\Lambda$ of antenna ports, $N_1$, and $N_2$ or based on the sequence number $n_{SRS}$ of the quantity of SRS transmissions, the quantity $\Lambda$ of antenna ports, $b_{hop}$, $B_{SRS}$, $N_2$, and $N_3$, the index $\alpha(n_{SRS})$ corresponding to the antenna port used to transmit the SRS, wherein the index $\alpha(n_{SRS})$ corresponding to the antenna port used to transmit the SRS for an $n_{SRS}{}^{th}$ time is different from an index $\alpha(n_{SRS}+\Lambda)$ corresponding to an antenna port used to transmit the SRS for an $(n_{SRS}+\Lambda)^{th}$ time.

* * * * *